United States Patent
Hou et al.

(10) Patent No.: US 9,690,036 B1
(45) Date of Patent: Jun. 27, 2017

(54) CONTROLLING DISPLAY LIGHTING COLOR AND UNIFORMITY

(71) Applicant: Amazon Technologies, Inc., Reno, NV (US)

(72) Inventors: Weihsin Hou, Fremont, CA (US); Jukka Kristian Backman, Kirkkonummi (FI)

(73) Assignee: Amazon Technologies, Inc., Reno, NV (US)

( * ) Notice: Subject to any disclaimer, the term of this patent is extended or adjusted under 35 U.S.C. 154(b) by 141 days.

(21) Appl. No.: 14/042,130

(22) Filed: Sep. 30, 2013

(51) Int. Cl.
F21V 8/00 (2006.01)

(52) U.S. Cl.
CPC .................. G02B 6/005 (2013.01)

(58) Field of Classification Search
CPC ...... G02B 6/005; G02B 6/0073; G02B 5/003; G02B 5/22; G02B 3/0006; G02B 6/0041; G02B 6/243; H01L 51/5281; H01L 33/50; H01L 25/0753; H01L 2924/12041; H01L 33/58; H01L 51/5012; H01L 33/38; H01L 31/055; H01L 29/78633; H01L 33/502; H01L 27/14625; H01L 27/153; H01L 27/14623; H01L 2933/0041; H01L 31/02164; G02F 1/133504; G02F 1/133606; G02F 1/133512; G02F 1/133603; G02F 1/133611; G02F 1/136209; G02F 2201/08
See application file for complete search history.

(56) References Cited

U.S. PATENT DOCUMENTS

| | | | | |
|---|---|---|---|---|
| 5,852,483 A * | 12/1998 | Newstead | ......... | G02F 1/133615 349/61 |
| 6,340,824 B1 * | 1/2002 | Komoto | ................ | H01L 33/508 257/100 |
| 6,717,355 B2 * | 4/2004 | Takahashi | ............... | C03C 3/045 252/301.4 R |
| 8,770,801 B1 * | 7/2014 | Berns et al. | ............. | 362/311.02 |
| 8,848,137 B2 | 9/2014 | Hu et al. | | |
| 2003/0223218 A1 | 12/2003 | Kawakami | | |

(Continued)

FOREIGN PATENT DOCUMENTS

WO    WO2013039268    * 3/2013

OTHER PUBLICATIONS

Office Action for U.S. Appl. No. 14/042,232, mailed on Aug. 27, 2015, to Hou et al., "Shaping Reflective Material for Controlling Lighting Uniformity", 7 pages.

*Primary Examiner* — Anh Mai
*Assistant Examiner* — Fatima Farokhrooz
(74) *Attorney, Agent, or Firm* — Lee & Hayes, PLLC

(57) ABSTRACT

In some examples, a lighting apparatus includes a light guiding component having a light absorbing material disposed on at least one surface. The light absorbing material may be selected to have light absorbing properties to compensate for variations in the color of portions of light emitted by a light source. For instance, the color of the light absorbing material may be generally complimentary to an undesirable color of a portion of the emitted light. Consequently, by reflecting the portion of light off the light absorbing material, the undesirable color may be absorbed from the portion of the light so that the resulting light is of a more uniform color. This disclosure also describes techniques for assembling electronic devices in a component stack to provide enhanced display lighting uniformity.

20 Claims, 18 Drawing Sheets

(56) References Cited

U.S. PATENT DOCUMENTS

| | | |
|---|---|---|
| 2006/0002141 A1 | 1/2006 | Ouderkirk et al. |
| 2006/0203511 A1 | 9/2006 | Tseng |
| 2006/0291244 A1 | 12/2006 | Yang et al. |
| 2008/0175022 A1* | 7/2008 | Sugiura ................ G02B 6/0091 362/609 |
| 2010/0231806 A1* | 9/2010 | Kuromizu ......... G02F 1/133604 348/725 |
| 2010/0238684 A1 | 9/2010 | Chiu et al. |
| 2012/0162569 A1* | 6/2012 | Sekiguchi et al. .............. 349/58 |
| 2012/0230008 A1* | 9/2012 | Ajichi et al. .................... 362/19 |
| 2013/0044509 A1* | 2/2013 | Chung ............. G02F 1/133606 362/602 |
| 2013/0051064 A1* | 2/2013 | Shiraishi .......... G02F 1/133603 362/602 |
| 2013/0107525 A1* | 5/2013 | Woodgate et al. ........... 362/237 |
| 2014/0104877 A1* | 4/2014 | An et al. ...................... 362/609 |
| 2014/0226361 A1* | 8/2014 | Vasylyev ..................... 362/606 |
| 2014/0240612 A1* | 8/2014 | Gotou ............... G02F 1/133615 348/791 |
| 2015/0023053 A1* | 1/2015 | Kim et al. ................... 362/607 |

* cited by examiner

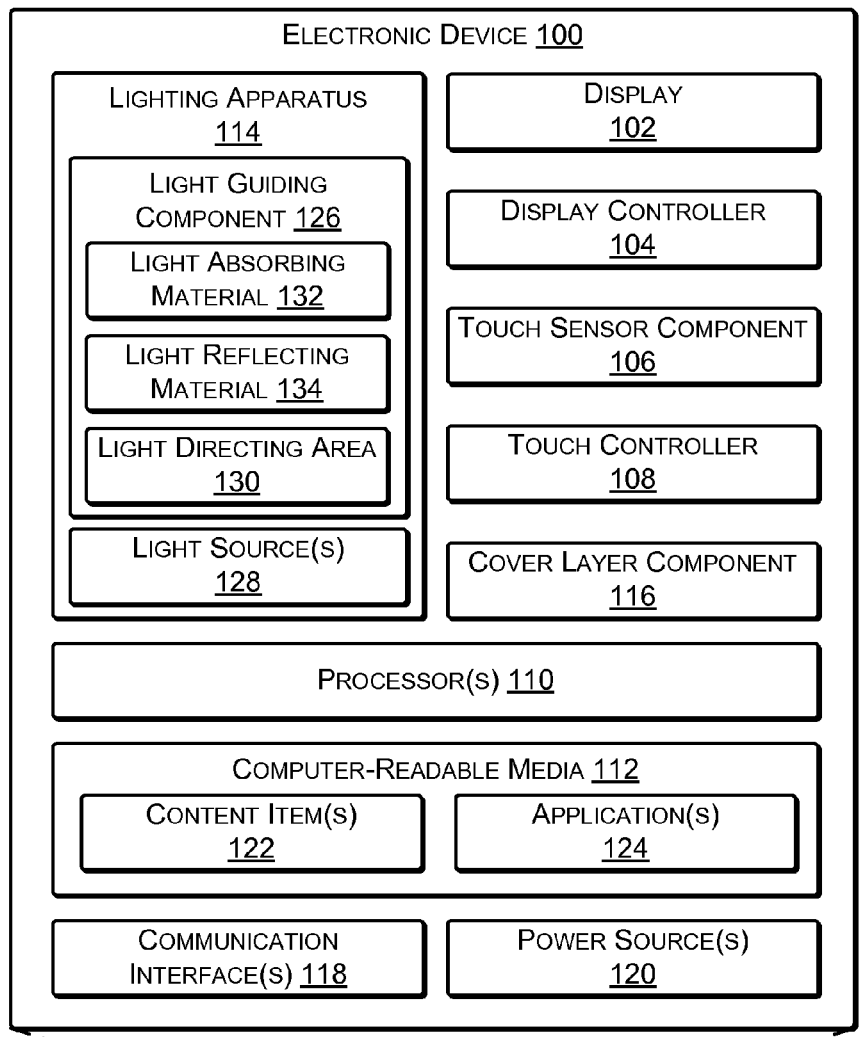
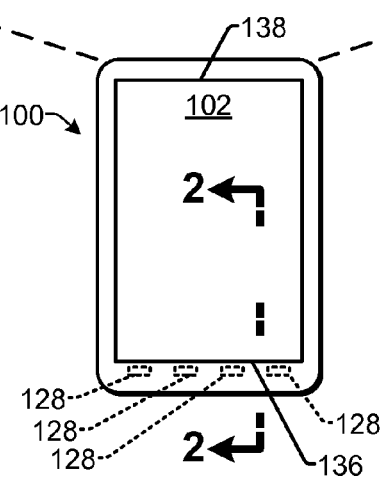
FIG. 1

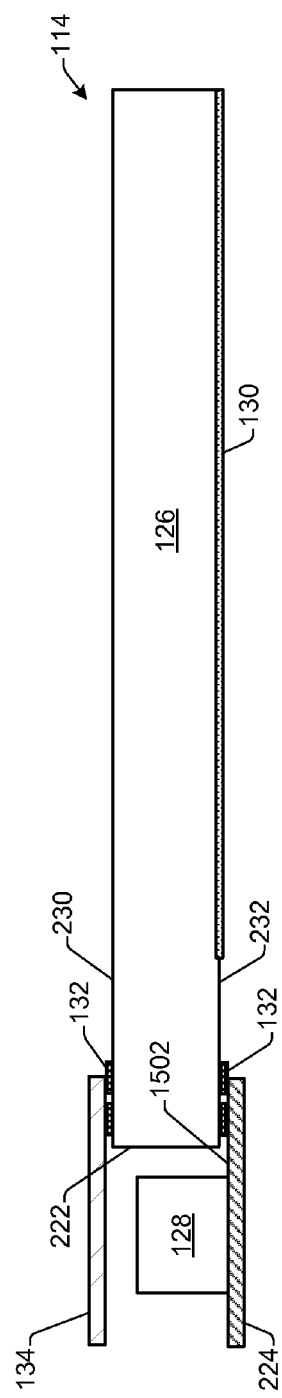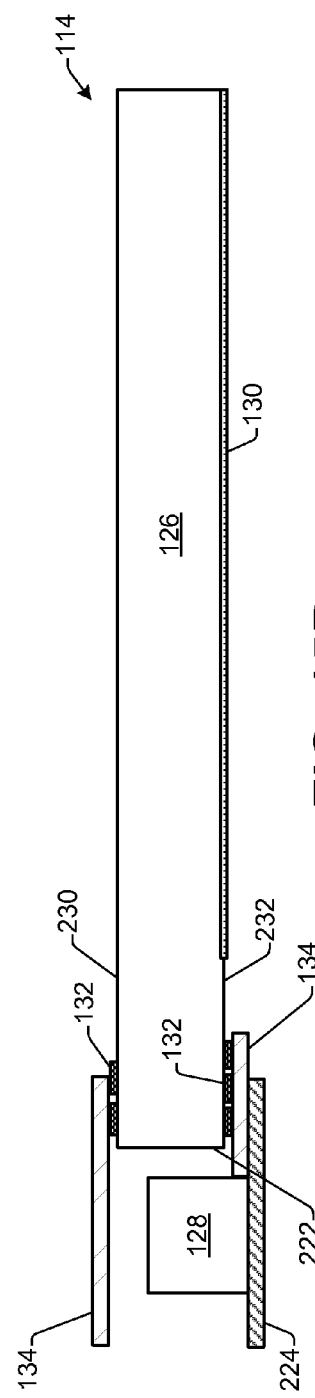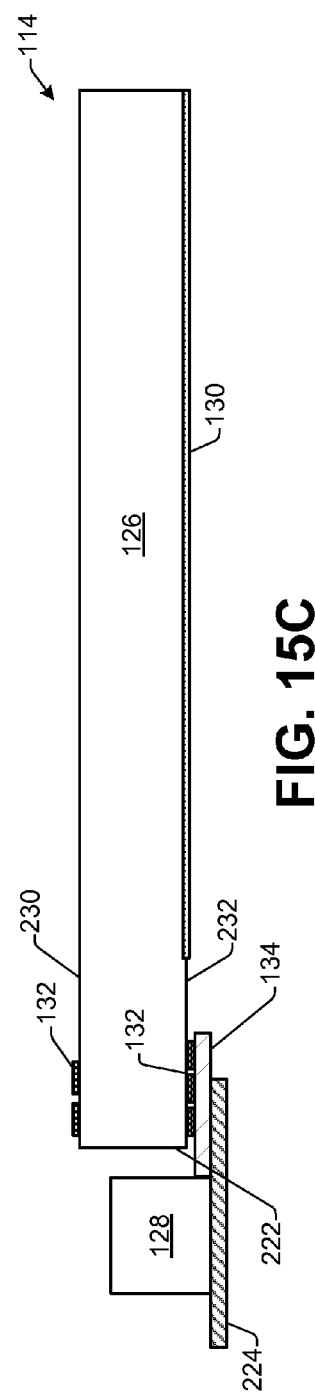

CONTROLLING DISPLAY LIGHTING COLOR AND UNIFORMITY

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. Further, some displays may include front lights or back lights that can make the content on the display easier to view under various different types of ambient lighting conditions. The appearance and quality of a display can affect the user's experience with the electronic device and the content presented thereon.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example electronic device configured with features to improve display lighting color and/or display lighting uniformity according to some implementations.

FIGS. 15A-15C illustrate cross sectional views of example configurations of light absorbing material and reflective material on a lighting apparatus according to some implementations.

DETAILED DESCRIPTION

Figure 2:
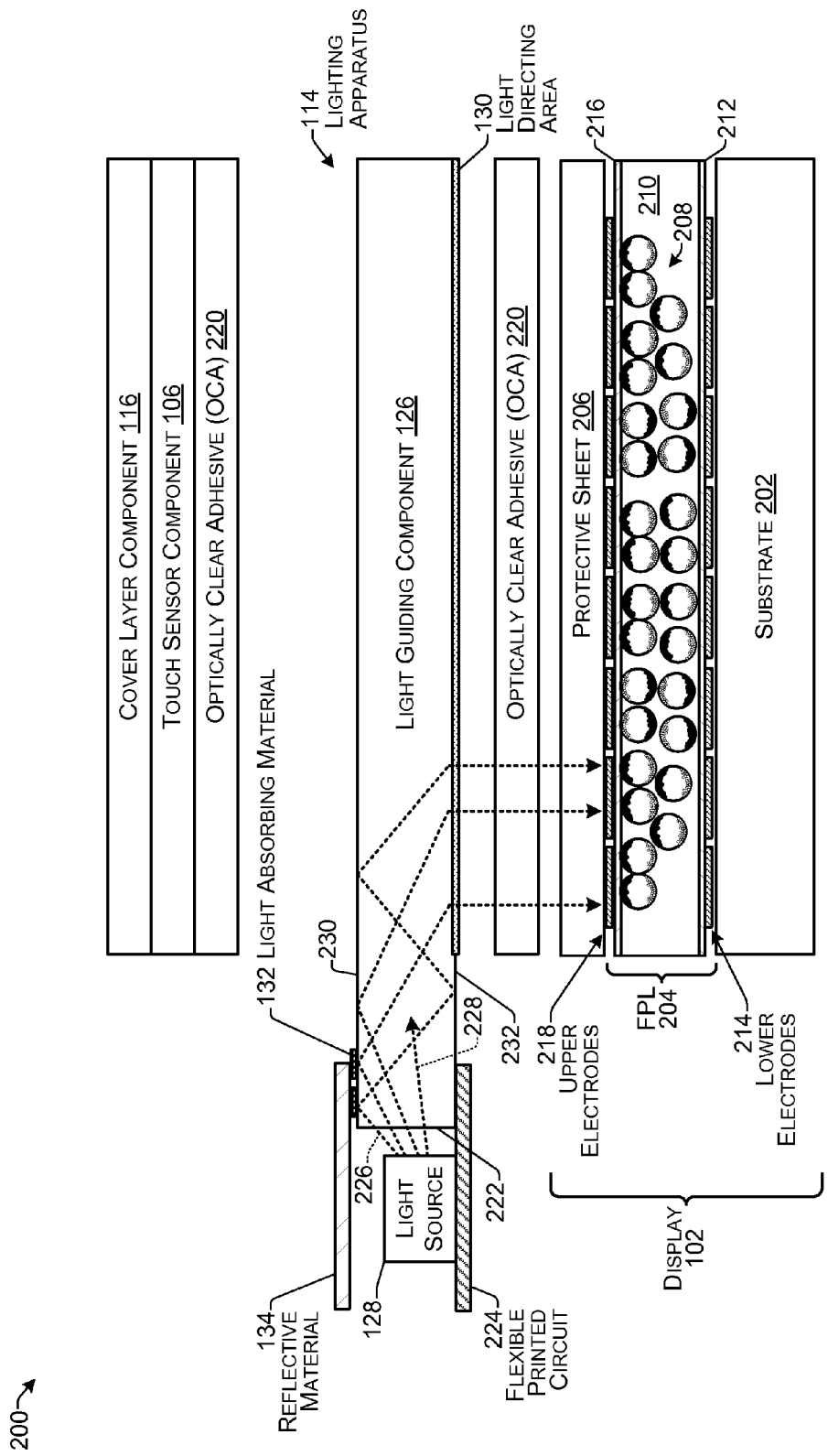
FIG. 2 illustrates an example schematic cross-section of a display assembly of the electronic device taken along line 2-2 of FIG. 1 according to some implementations.

This disclosure describes techniques and arrangements for controlling the color and uniformity of lighting provided through a light guiding component. In some examples, the techniques and arrangements herein may be employed with one or more light sources, such as Light Emitting Diodes (LEDs), in a lighting apparatus, such as for an electronic device that includes a display for rendering content. For instance, a light guiding component of the lighting apparatus may receive light from the one or more light sources and may direct the light to provide illumination for a display. In some cases, the display may be a reflective display that is front-lit by the lighting apparatus. In other cases, the display be a backlit display that is backlit by the lighting apparatus. Furthermore, implementations herein are not limited to providing lighting for electronic displays, but may be extended to other types of lighting where uniform light distribution and uniform light coloration is desired.

In some examples, the lighting apparatus herein may be used to provide white light in a uniform manner to a display. Many LEDs used for producing white light typically include a blue LED die encapsulated by a yellow phosphor encapsulant inside a frame holder. The light rays generated by the blue LED pass through the phosphor encapsulant, which excites the phosphor particles to produce yellow light. The blue light from LED combines with the yellow light from the phosphor particles to create white light. However, in conventional white LED packages, the distance from the blue LED light source to the emitting surface of the LED package is not the same for rays traveling in different directions. Rather, blue LED light rays emitted at an angle pass through more phosphor than those rays traveling straight ahead along a central axis of light travel. This causes the rays emitted at an angle from the central axis of light travel to include more yellow light, which causes these rays to be yellow rather than the desired white. The yellower rays can create a yellow mura or yellow artifacts in a light guiding component, which can be visible to a user (e.g., as yellowish areas or patches, yellowish lines, or the like). Accordingly, some implementations herein reduce or eliminate these yellow artifacts. As one example, a blue material, such as ink, dye, paint, or other light absorbing material able to absorb yellow wavelengths of light (e.g., in the wavelength range of 530-580 nm) may be disposed on the light guiding component along a pathway that is traversed by the wider-angled, more yellow, light rays emitted from the light source. The light absorbing material can adjust a color of the light by absorbing the yellow wavelength constituents of the light and can thereby reduce or eliminate the yellowing artifacts.

In some examples, the light absorbing material can be a blue material disposed on the top surface and/or the bottom surface of a light guiding component. For instance, the light absorbing material may be deposited at particular limited areas on the light guiding component, such as in a predetermined pattern or a random pattern. Various techniques may be used for applying the light absorbing material onto the light guiding component, such by screen printing, gravure printing, pad printing, flexographic printing, inkjet printing, stamping, or by any of various other printing techniques, as well as dying, painting, or coating methods. As one example, the light absorbing material may be deposited in a predetermined pattern, such as a pattern of single blue dots (e.g., in a desired shape), a combination of multiple dots, a combination of dots in multiple different colors, and so forth. Alternatively, the light absorbing material can be printed or otherwise deposited onto a clear substrate first, and then laminated along with the clear substrate onto the light guiding component. As another alternative, light absorbing material can be printed onto a white substrate first, and then laminated along with the white substrate onto the light guiding component. The density and color of the light absorbing material can be tuned to absorb a desired amount of the yellow light rays traveling along particular light paths within the light guiding component for adjusting the color of the light emitted from the light guiding component toward a desired color. Furthermore, implementations herein are not limited to the use of blue material as the light absorbing material, but may be extended to any suitable color or shade for controlling and manipulating the coloration of light generated from an LED or other light source. For example, the light absorbing material may be used to absorb light at certain locations on the light guiding component to reduce "hot spots" for providing a more uniform light intensity distribution.

Furthermore, some implementations employ white tape or other reflective material located in one or more selected positions with respect to the light sources to control the light distribution and uniformity within the light guiding component. As one example, a high reflectivity "white tape" may be disposed on a top surface and/or a bottom surface of the light guiding component, adjacent to or in line with the light sources, to improve the uniformity of the light distribution. In some examples, the reflective material may be cut or shaped into particular shapes to provide desired light distribution effects. Furthermore, the reflective material may be selected to be of a controlled white hue to compensate for variations in lighting color, such as where the color emitted by an LED is slightly off from ideal white. In this way, the complementary color of the reflective material combined with the color of the LED light output can cause the output spectrum to be uniform and white. Therefore, the amount of light intensity from the LED light source can be manipulated by the location, shape and size of the white tape or other reflective material applied to the surface of the light guiding component.

As one example, the white tape or other reflective material may be applied to the light guiding component in proximity to the central axis of light travel of the light sources to manipulate the light distribution in the bottom region of the light guiding component. For instance, the white tape may be die cut to a certain shape to purposely produce a non-uniform light reflection and/or diffusion, which can be manipulated to cause an overall light intensity distribution that is naturally non-uniform to become more uniform. Accordingly, the white tape may be cut into a shape such that the area directly above an LED light source has white tape coverage that is different from the white tape coverage in the area between two light sources. For example, the white tape can be die-cut into a desired shape and laminated to or otherwise applied to the light guiding component at a particular location for achieving a desired light distribution effect. The white tape can be a continuous piece with a certain shape along one edge, or a plurality of separate pieces of white tape, each cut to have a desired shape.

Furthermore, rather than using die-cut white tape, some examples herein may employ a pattern or shape of reflective material that is printed or otherwise deposited directly onto a surface of the light guiding component adjacent to an entry point or central axis of the rays of light from the light source. For instance any suitable reflective white material or other reflective material may be disposed on the surface of the light guiding component at a particular location for achieving a desired light distribution effect, such as reflection of the light, diffusion of the light, scattering of light, and the like. Furthermore, the white tape or other reflective material can be implemented together with the light absorbing material discussed above for controlling the yellowing effects discussed above while also achieving higher light distribution uniformity.

For discussion purposes, some example implementations are described in the context of providing lighting for a display of an electronic device through a light guiding component. This disclosure also describes techniques for assembling electronic devices in a component stack to provide enhanced display illumination uniformity and improved user experience. However, the implementations herein are not limited to the particular examples provided, and may be extended to other types of lighting applications, other types of devices, and other uses, as will be apparent to those of skill in the art in light of the disclosure herein.

FIG. 1 illustrates an example electronic device 100 that may include the lighting distribution uniformity and lighting coloration control features discussed above. The device 100 may comprise any type of electronic device having a display 102. For instance, the device 100 may be a mobile electronic device (e.g., an electronic book reader, a tablet computing device, a laptop computer, a smart phone or other multi-function communication device, a portable digital assistant, a wearable computing device, an automotive display, etc.). Alternatively, the device 100 may be a non-mobile electronic device (e.g., a computer display, a television, an appliance, a cash register, etc.). In addition, while FIG. 1 illustrates several example components of the electronic device 100, it is to be appreciated that the electronic device 100 may also include other conventional components, such as an operating system, system busses, input/output components, and the like. Further, in other examples, such as in the case of a television or computer monitor, the electronic device 100 may only include a subset of the components shown.

Regardless of the specific implementation of the electronic device 100, the device 100 may include the display 102 and a corresponding display controller 104. The display 102 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 102 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 100, the display 102 may be an active display such as a liquid crystal display, a plasma display, a light emitting diode display, an organic light emitting diode display, and so forth. For example, the lighting apparatus herein may be used to front-light or backlight a display. Accordingly, implementations herein are not limited to any particular display technology. Further, in addition to displays, the lighting apparatus herein can be used to light other types of surfaces, other types of components, and may be further used for signs, lighting panels, and so forth.

In one implementation, the display 102 comprises an electrophoretic display that moves particles between different positions to achieve different color shades. For instance, when a pixel is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the display absorbs the incident light and, hence, causes the pixel to appear black to a viewing user. In addition, the particles may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 102 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller 104 may utilize different arrays of both light and dark particles. In some cases, the particles may be contained in tiny individual transparent capsules, such as approximately 40 micrometers in diameter. The capsules are suspended in a fluid, such as a liquid polymer, between a transparent upper electrode grid layer and a lower electrode grid layer separated by a gap, such as approximately 50-200 micrometers.

In still another implementation, the display 102 may comprise an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 102 may represent a backlit display, examples of which are mentioned above.

In addition to including the display 102, FIG. 1 illustrates that some examples of the device 100 may include a touch sensor component 106 and a touch controller 108. In some instances, at least one touch sensor component 106 resides with, or is stacked on, the display 102 to form a touch-sensitive display (e.g., an electronic paper touch-sensitive display). Thus, the display 102 may be capable of both accepting user touch input and rendering content in response to or corresponding to the touch input. As several examples, the touch sensor component 106 may comprise a capacitive touch sensor, a force sensitive resistance (FSR), an interpolating force sensitive resistance (IFSR) sensor, or any other suitable type of touch sensor. In some instances, the touch sensor component 106 is capable of detecting touches as well as determining an amount of pressure or force of these touches.

FIG. 1 further illustrates that the electronic device 100 may include one or more hardware processors 110 and one or more computer-readable media 112, as well as a lighting apparatus 114 (which may be a lighting apparatus in the case of a front-lit or reflective display, or alternatively, a backlight component in the case of a backlit display) for lighting the display 102, a cover layer component 116, such as a cover glass or cover sheet, one or more communication interfaces 118 and one or more power sources 120. The communication interfaces 118 may support both wired and wireless connection to various networks, such as cellular networks, radio, WiFi networks, short range networks (e.g., Bluetooth®), infrared (IR), and so forth.

Depending on the configuration of the electronic device 100, the computer-readable media 112 (and other computer-readable media described throughout) is an example of computer storage media and may include volatile and nonvolatile memory. Thus, the computer-readable media 112 may include, but is not limited to, RAM, ROM, EEPROM, flash memory, or other memory technology, or any other medium that can be used to store computer-readable instructions, programs, applications, media items, and/or data which can be accessed by the electronic device 100. In some examples, the computer-readable media is a tangible non-transitory computer-readable media.

The computer-readable media 112 may be used to store any number of functional components that are executable on the processor 110, as well content items 122 and applications 124. Thus, the computer-readable media 112 may include an operating system and data storage to store one or more content items 122, such as eBooks, audio books, songs, videos, still images, and the like. The computer-readable media 112 of the electronic device 100 may also store one or more content presentation applications to render content items on the device 100. These content presentation applications may be implemented as various applications 124 depending upon the content items 122. For instance, the content presentation application may be an electronic book reader application for rending textual electronic books, an audio player for playing audio books or songs, a video player for playing video, and so forth.

In some instances, the electronic device 100 may couple to a cover (not shown in FIG. 1) to protect the display (and other components in the display stack or display assembly) of the device 100. In one example, the cover may include a back flap that covers a back portion of the device 100 and a front flap that covers the display 102 and the other components in the stack. The device 100 and/or the cover may include a sensor (e.g., a hall effect sensor) to detect when the cover is open (i.e., when the front flap is not atop the display and other components). The sensor may send a signal to the lighting apparatus 114 when the cover is open and, in response, the lighting apparatus 114 may illuminate the display 102. When the cover is closed, meanwhile, the lighting apparatus 114 may receive a signal indicating that the cover has closed and, in response, the lighting apparatus 114 may turn off.

Furthermore, the amount of light emitted by the lighting apparatus 114 may vary. For instance, upon a user opening the cover, the light from the lighting apparatus may gradually increase to its full illumination. In some instances, the device 100 includes an ambient light sensor (not shown in FIG. 1) and the amount of illumination of the lighting apparatus 114 may be based at least in part on the amount of ambient light detected by the ambient light sensor. For example, the lighting apparatus 114 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 102 may vary depending on whether the lighting apparatus 114 is on or off, or based on the amount of light provided by the lighting apparatus 114. For instance, the electronic device 100 may implement a larger default font or a greater contrast when the lighting apparatus is off, as compared to when the lighting apparatus is on. In some instances, the electronic device 100 maintains, when the lighting apparatus is on, a contrast ratio for the display that is within a certain defined percentage of the contrast ratio when the lighting apparatus is off.

As described above, the touch sensor component 106 may comprise a capacitive touch sensor that resides atop the display 102. In some examples, the touch sensor component 106 may be formed on or integrated with the cover layer component 116. For instance, the transparent electrode array for the touch sensor component 106 may be patterned onto an underside surface of the cover layer component 116. In other examples, the touch sensor component 106 may be a separate component in the stack of the display assembly. In such a case, the lighting apparatus 114 may reside atop or below the touch sensor component 106. In some instances, either the touch sensor component 106 or the lighting apparatus 114 is coupled via optically clear adhesive (OCA), such as a solid OCA (SOCA) or a liquid OCA (LOCA), to a top surface of a protective sheet of the display 102. As one example, the lighting apparatus 114 may include a light-guide sheet as a light guiding component 126 and one or more light sources 128. The light guiding component 126 may comprise a substrate, such as of a transparent thermoplastic (e.g., PMMA (poly(methyl methacrylate)) or other acrylic, polycarbonate, etc.) or glass.

In some cases, the light guiding component 126 includes one or more light directing areas 130 formed on at least one surface. In the illustrated example, the light directing area 130 is formed on a bottom surface of the light guiding component 126, and is configured to direct light out through the bottom surface of the light guiding component 126. In other examples, the light directing area 130 may be on the top surface of the light guiding component 126, or on both the bottom surface and the top surface. In addition, in some cases, the light guiding component 126 does not include a light directing area 130. As one example, the light directing area 130 may include a layer of lacquer or other material, and multiple grating elements formed in the layer of lacquer that function to direct light from the light source toward the display 102. The grating elements are configured to distribute the light to the display uniformly, thus illuminating the display 102, and then allow the light reflected from the display to pass back through the light guiding component to enable the image presented on the display to be viewed by a user. To create the grating elements, the layer of lacquer may be applied to the substrate of the light guiding component 126, the grating elements may be embossed to the layer of lacquer, and the light guiding component 126 may be UV-cured. In some instances, the UV-cured lacquer is made of a cross-linked, tri-functional polymer material that co-polymerizes to a plastic solid when exposed to a high-intensity UV light source. Alternatively, the substrate of the light guiding component 126 and the grating elements may be manufactured as a single element, such as by an injection molding process. Further, other examples may include other types of light guides and light guiding components, such as those that include refractive elements (e.g., lenslets to redirect light from a light source in selected directions). In addition, some implementations may include respective light sources positioned to emit light into multiple sides of the light guiding component 126.

The light guiding component 126 may further include a light absorbing material 132 printed or otherwise disposed at one or more locations on a surface of the light guiding component 126, as discussed above, such as in one or more locations for absorbing yellow wavelengths of light produced by an LED light source. For instance, the light absorbing material 132 may be a blue colored material or any other suitable color for absorbing a desired range of wavelengths of light. The light absorbing material 132 may be deposited in a pattern at a selected location for absorbing a desired amount of yellow light to reduce or eliminate yellowing effects from the one or more light sources 128. Techniques, arrangements and configurations for the light absorbing material 132 are discussed additionally below.

In addition, the light guiding component 126 may include light reflecting material 134 disposed on a surface of the light guiding component 126, such as in proximity to or adjacent to the one or more light sources 128. As one example, the light reflecting material 134 may be a reflective white tape, such as LAB W55, available from Teraoka Seisakusho Co. Ltd of Tokyo, Japan. For instance, the reflective white tape may have a high degree of reflectivity and a high shading rate, with low glare and light diffusing properties, which allows light produced by the light sources 128 to be reflected substantially uniformly through the light guiding component 126. Additionally, in other examples, rather than using a tape as the reflective material 134, a coating or layer of reflective material may be applied or deposited in a desired shape at a desired location on the surface of the light guiding component 126 for achieving a desired light distribution effect as discussed additionally below. Further, in other examples, rather than having a highly diffusive surface, the reflective material may have a specular surface for reflecting light in a specular manner, or a surface that is partially diffusive and partially specular. The reflective material 134 may also be selected to be of a controlled white hue to compensate for variances in the color emitted by the light sources 128, such as where the light emitted from an LED has a bluish tinge, or is otherwise slightly off from ideal white. In this manner, the complementary color of the reflective material 134 combined with the color of the LED light can cause the output spectrum to be uniform and white.

The cover layer component 116 may include a transparent substrate or sheet having an outer layer that functions to reduce at least one of glare or reflection of ambient light incident on the electronic device 100. In some instances, the cover layer component 116 may comprise a hard-coated polyester and/or polycarbonate film, including a base polyester or a polycarbonate, that results in a chemically bonded UV-cured hard surface coating that is scratch resistant. As one example, the cover layer component 116 may be manufactured with additives such that the resulting film includes a hardness rating that is greater than a predefined threshold. Without such scratch resistance, a device may be more easily scratched and a user may perceive the scratches from the light that is dispersed over the top of the reflective display. The cover layer component 116 may also include a UV filter for the purpose of protecting components lower in the stack from UV light incident on the electronic device 100. The cover layer component 116 may also be configured to provide other desirable device characteristics.

Additionally, FIG. 1 illustrates that the one or more light sources 128 may comprise one or more (e.g., four) LEDs, which may reside toward a bottom side 136 of the display 102 of the electronic device 100. By positioning the light sources 128 along the bottom side 136 of the display 102 relative to the content being displayed, light from the light sources 128 is generally directed away from a user consuming the content and, hence, is not directed into the user's eyes. For example, because users typically hold the electronic device 100 with a top side 138 of the display 102 further away from the user's eyes than the bottom side 136 (i.e., with the top side 138 tilted away from the user, given the user's line of sight to the top side 138), the light sources 128 positioned on the bottom edge 136 of the display 102 will generally shine towards the top side 138 and away from the user's eyes. As such, positioning the light sources 128 in this manner may decrease the chances of the light being directed into a user's eyes.

FIG. 2 illustrates an example of a schematic cross-section of a component stack of a display assembly 200 of the electronic device 100 taken along line 2-2 from FIG. 1. A housing of the device 100 and other components of the device 100 described above are omitted from this figure for the sake of clarity of illustration. In this example, the display 102 is a reflective display that includes a substrate 202, such as of glass or other suitable material, a front plane laminate (FPL) 204, which serves as an image-displaying component, and a protective sheet 206. In the illustrated example, the FPL 204 comprises e-ink capsules 208, as well as a fluid 210 in which the capsules 208 are suspended. As alternative example (not shown in FIG. 2), in the case of an electrowetting display, the FPL 204 may include a plurality of pixel elements, each containing liquid subject to electrowetting activation such that voltage may be applied to individual pixel elements to modify the surface tension of the liquid and thereby change the appearance of the pixel element.

The FPL 204 includes a lower plastic film 212 onto which the fluid 210 and capsules 208 are deposited, such as using a roll-to-roll process. A grid or pattern of lower electrodes 214 is associated with the lower plastic film 212. Similarly, an upper transparent plastic film 216 may be located on the upper side of the fluid 210 for containing the fluid 210 and the capsules 208. A grid or pattern of transparent upper electrodes 218 may be formed on, or otherwise associated with, the upper film 216. In some cases, the upper electrodes 218 may be formed from indium tin oxide or other suitable transparent conductive material. As one example, aligned pairs of the upper and lower electrodes 218 and 214, respectively, may each form a single pixel of the display 102. For instance, each capsule 208 may include dark and light particles inside the capsule 208. A positive charge on an electrode pair may cause a first color of particle to rise toward the upper plastic film 216 while a negative charge on an electrode pair may cause a second color of particle to rise toward the plastic film 216. The display controller 104, discussed above with respect to FIG. 1, may control the charge applied to each electrode pair. Furthermore, in some examples, the pixels (i.e., electrode pairs) may be controlled by applying a sequence of voltages to each pixel, instead of just a single value as in a typical LCD. These sequences of voltages may be referred to as "waveforms," and may be employed to prevent over-charging of the capsules 208, prevent damage to the capsules 208, and so forth.

The protective sheet 206 may be assembled atop the FPL 204, so that the FPL 204 is sandwiched between the protective sheet 206 and the substrate 202. Thus, the protective sheet 206, the FPL 204, and the substrate 202 may be assembled together to form the display 102. For instance, the display elements 202, 204 and 206 may be laminated or bonded together. Alternatively, a bezel or housing may be placed around the perimeter of the display elements, or other suitable manufacturing technique may be used for assembling the elements of the display 102.

In the example of FIG. 2, a bottom surface of the lighting apparatus 114 is coupled to the protective sheet 206 by a layer of OCA 220, such as solid OCA, liquid OCA, or the like. Further, the touch sensor component 106 and cover layer component 116 may be coupled to an top surface of the lighting apparatus 114 by another layer of OCA 220. In some cases, a refractive index of the OCA 220 contacting the lighting apparatus 114 may be less than a refractive index of the substrate of the light guiding component 126. For instance, the difference between the refractive index of the light guiding component 126 and the refractive index of each layer of the OCA 220 may be at least 0.3 in some examples. Selecting OCA materials having low refractive indices on both sides of the light guiding component 126 may result in high internal reflection of the light from the light source(s) 128.

In some examples, one or more of the layers of OCA 220 may be LOCA. For instance, during assembly, the LOCA may be deposited onto the protective sheet 206, when the LOCA reaches the corners of the protective sheet 206, the corners may be UV-cured. Thereafter, the LOCA 220 on the remaining portion of the protective sheet 206 may be UV-cured. Further, while this example includes LOCA, in other instances the LOCA may be replaced with a solid OCA dimensioned to accommodate the various components. In either instance, the LOCA or the SOCA may be formed from an acrylic material and/or, in some instances, from silicone. For instance, the LOCA may comprise Loctite® 5192 and/or MSDS made by Nalax3®. The MSDS comprises UV-curable polyurethane acrylates based in a formulation comprised of hexamethylene diacrylate, Urethane acrykate oligomer, Acyrlate ester and photoinitiator. This formulation may achieve balanced coating properties such as tensile properties, hardness, weatherability, and adhesion. The LOCA may be created by applying the formulation to PMMA rolls using a wet coating method immediately followed by embossing and UV curing.

The lighting apparatus 114 includes the light guiding component 126 and one or more light sources 128. As mentioned above, the light guiding component 126 may be a sheet of acrylic or other light-guiding material, and may have etchings, gratings or other patterns formed thereon as one or more light directing areas 130 for directing light from the light source 128 toward the display 102. Each light source 128 may include one or more LEDs or other suitable sources of illumination positioned to emit light toward at least one edge 222 of the light guiding component 126.

Further, in this example, the touch sensor component 106 may be integral with the underside of the cover layer component 116. For example, a transparent touch sensor electrode pattern may be formed on the underside of the cover layer component 116. As one example, a touch sensor electrode pattern may be a grid of linear transparent electrodes patterned onto the underside of the cover layer substrate to function as a capacitive touch sensor. In other examples, the touch sensor component 106 may be a separate component, and may be located between the light guiding component 126 and the display 102 and coupled thereto by OCA 220.

The electronic device 100 may also include a bezel (not shown in FIG. 2) optically connected to the other elements in the stack. For instance, the bezel may couple to the cover layer component 116 or to another component in the stack via SOCA, LOCA or via any of various other means. The bezel may function to absorb stray light from the light source 128, thus helping to maintain the uniformity of the light emitted by the lighting apparatus 114 onto the display 102. To absorb light in this manner, in some instances the underside of the bezel may be black or another dark color. Additionally or alternatively, the device 100 may include black or dark adhesive, or other material, around the perimeter edges of the display stack to prevent light from escaping around the edges of the lighting apparatus 114.

Accordingly, the display assembly 200 of FIG. 2 provides a reflective display 102 having a front light and touch input capability. Further, while a particular example of a display assembly 200 has been described with respect to FIG. 2, numerous other display assembly configurations incorporating the lighting techniques herein will be apparent to those of skill in the art having the benefit of this disclosure.

In the example of FIG. 2, the light source 128 may be coupled to a flexible printed circuit (FPC) 224, and the FPC 224 may be coupled to the light guiding component 126 to at least partially form the lighting apparatus 114. The FPC 224 may provide electrical power and control to the light source(s) 128. The light from the one or more light sources 128 may generally travel along the major plane of the light guiding component 126 and the display 102 until the light contacts the grating elements in the light directing area 130, at which point the grating elements may direct the light downward toward the display 102. In some instances, the multiple LEDs may be positioned such that they collectively emulate a single point source. For instance, each LED may emit light over a particular angle that is in the shape of a cone or pyramid. The LEDs may be aligned and spaced (relative to one another and relative to an active area of the display) such that these triangles overlap in a manner so that the lighted display does not include overly bright spots or overly dim spots.

Placement of the reflective material 134 adjacent to and in proximity to the edge 222 of the light guiding component 126 can assist in providing a uniform lighting of the display 102. Further, in some examples, another layer of white tape or other reflective material 134 may be placed between the FPC 224 and the bottom surface of the light guiding component 126. Alternatively, the surface of the FPC 224 that couples to the bottom surface of the light guiding component 126 may be processed to include a coating of a light-diffusing reflective material 134, e.g., in the form of a white, matte or rough reflective finish that optically helps to diffuse and reflect light from the light source 128 as diffusive reflection and, hence, increase the uniformity of the light across the lighting apparatus 114 and the display 102. Further, in other examples, the reflective material 134 may include a non-diffusive reflective surface to reflect light in a specular fashion as specular reflection, or a surface that reflects light in a fashion that is partially specular and partially diffusive, depending on the desired light distribution pattern to be achieved. Thus, while the white tape or other reflective material 134 is described as being configured on the top surface of the light guiding component 126, in some configurations the white tape or other reflective material 134 may be positioned on both the top surface and the bottom surface of the light guiding component 126.

As one example, OCA may be used to bond or otherwise adhere the white tape to the surface(s) of the light guiding component 126, such as using an OCA (LOCA or SOCA) that has substantially the same refractive index as the light guiding component 126. Using an OCA with substantially the same refractive index as the light guiding component 126 can help maximize color and uniformity of the light. Further, in the examples in which white tape is not used, the reflective material may be applied to the surface of the light guiding component by any of printing, painting, coating or depositing, such as any of the techniques discussed herein for applying the light absorbing material or other suitable techniques. Accordingly, the reflective material may be any of a polymer, a metal, a ceramic, or a composite having a desired color and a specular reflective surface, a diffusive reflective surface, or a reflective surface having both specular and diffusive properties.

The white tape according to some examples herein may be dimensioned to have a thickness from approximately 100 microns to approximately 8 microns. For instance, thinner white tape material is less opaque, and therefore may be less reflective. One example of a white tape that may be used in some implementations is white polyethylene terephthalate (PET) film, or equivalent, having a thickness of approximately 30 microns, with a non-glossy surface finish on the surface configured to face the light guiding component 126. As mentioned above, one example of suitable high reflectivity white tape may be LAB W55 available from Teraoka Seisakusho Co. Ltd of Tokyo, Japan. LAB W55 is a white PET #40 (40 micrometer thickness) base film with 15 micrometer optically clear acrylic adhesive disposed thereon, for a total thickness of approximately 55 microns. The white color of the tape, in the L*a*b* color space, may be L* of approximately 92.09, a* of approximately −0.06 and b* of approximately −2.66. A high shading rate (i.e., amount of light that is blocked by the tape), is desirable, as is high reflectivity (i.e., the amount of light bouncing off the tape). For example, the LAB W55 tape has a shading rate of approximately 88% (with the average wavelength of light being blocked between 380 nm to 780 nm), and a reflectivity of approximately 88% (with the wavelength of light being reflected at about 400 nm). As discussed below, the specifications of the high reflectivity white tape may be tuned to compensate for or complement the color of the light output of the LEDs.

Additionally, other white tapes may be implemented in some examples herein, such as LAB W30 available from Teraoka Seisakusho Co. Ltd of Tokyo, Japan. Further, other white tapes, or other types of films or coatings may be used in some examples herein as the reflective material 134, such as polyethylene naphthalate (PEN), polyester or other white plastic films or surface coatings. The color of the reflective white tape may be defined, as discussed below, to further improve optical properties of the lighting apparatus 114. In some cases, the surface of the white tape facing the light guiding component may be rough to have a light-diffusing effect for providing a more uniform distribution of light across the display 102. Further, in other cases, the white tape may have a smooth, less-diffusive reflective surface to reflect light in a specular fashion, or in a fashion that is partially specular and partially diffusive, depending on the desired light distribution pattern.

While FIG. 2 illustrates an example stack, other implementations may utilize the same or different components in the same or different orders. In some examples, the stack may not include a display at all. Instead, the lighting apparatus 114 may light a component without a display, such as a keyboard, or may light a surface, a sign, or the like. For example, the lighting apparatus 114 may be used in an LED panel light, or for various other applications.

FIG. 2 further illustrates the light absorbing material 132 disposed on at least one surface of the light guiding component 126. As mentioned above, the rays of light 226 emitted at an angle from the light source 128 may include more yellow wavelength constituents than rays of light 228 emitted more directly or straight out of the light source 128. For example, the wider the angle from the central axis of light travel, the larger the yellow wavelength constituent included in the light. Accordingly, the light absorbing material 132 may be positioned in a location where the rays of light 226 that include more yellow wavelengths (i.e., the rays emitted at wider angles from the central axis) will impinge on and reflect off the light absorbing material 132. This can cause the light absorbing material 132 to absorb the yellow wavelengths (e.g., in a wavelength range of 530-580 nm) while reflecting back the more blue portions of the light, which will then be closer to the desired pure white light. As mentioned above, the light emitted from the light source 128 reflects within the light guiding component 126 and is directed by the one or more light directing areas 130 toward the display 102, thereby illuminating the display 102. The light reflects from the display 102, back through the light guiding component 126 and the other components in the stack 200 for viewing by a user of the electronic device 100. The presence of the light absorbing material 132 can reduce or eliminate the yellow artifacts that may otherwise occur. Further, the light absorbing material 132 may be applied to a top surface 230 of the light guiding component 126, a bottom surface 232 of the light guiding component 126, or to the edge 222 of the light guiding component 126.

Figure 3:
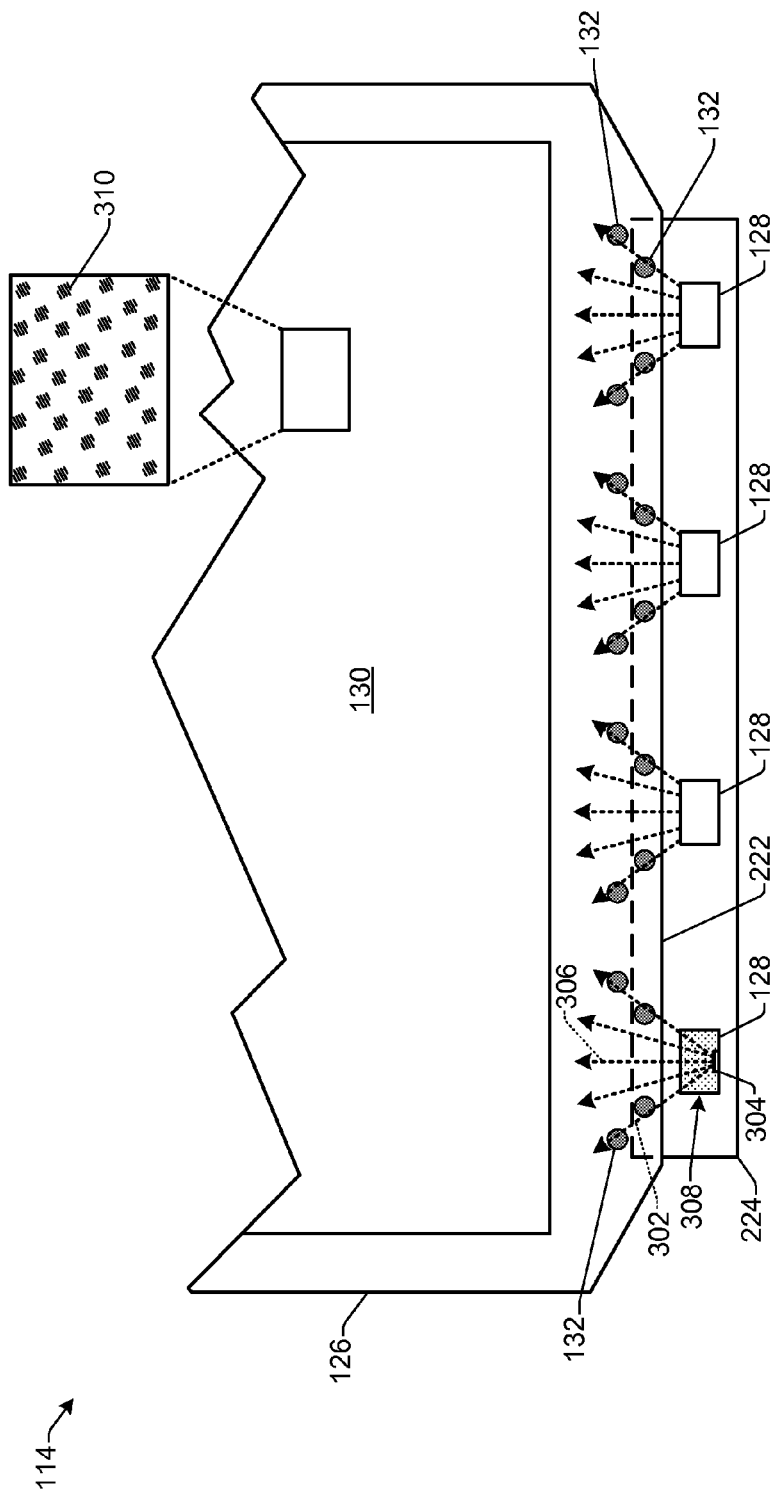
FIG. 3 illustrates a partial plan view of a lighting apparatus according to some implementations.

FIG. 3 illustrates a partial plan view of a lighting apparatus according to some implementations. The white tape or other reflective material 134 is not shown in the examples of FIGS. 3-6 for clarity of illustration. In the example of FIG. 3, there are four light sources 128 illustrated for emitting light toward the edge 222 of the light guiding component 126; however, more or fewer light sources 128 may be used. Further, the light absorbing material 132 in this example comprises pairs of dots or patches of light absorbing material 132 positioned along the path of light rays that are emitted at an angle from the central axis of light travel of the light source 128. For instance, a light ray 302 emitted from an LED 304 at an angle of approximately 30-45 degrees from perpendicular may reflect off of the light absorbing material 132, while light rays 306 that are emitted closer to perpendicular, i.e., along the central axis of light travel and more directly out of the light source 128 would not reflect off the light absorbing material 132.

As mentioned above, the light source 128 may include the LED 304, such as a blue light emitting LED, contained within a yellow-phosphor-containing substance 308. This arrangement may be referred to as a phosphor-based white LED. Due to the simplicity of manufacturing, the phosphor method is a popular method for making high-intensity white LEDs. As one example, the LED 304 may be an InGaN blue LED contained within a phosphor laden epoxy or other substance 308. A common yellow phosphor material is cerium-doped yttrium aluminum garnet (Ce3+:YAG). From FIG. 3, it may be seen that the light ray 302, emitted at an angle, will travel through more of the phosphor laden material 308 than the light ray 306, thus resulting in the light ray 302 having a larger yellow constituent than the light ray 306. Accordingly, the light absorbing material 132 is deposited in locations proximate to the light sources 128 so that the rays 302 emitted at wider angles will reflect off the light absorbing material 132, while the light rays 306 emitted at small angles will not reflect off of the light absorbing material 132. For example, because the light rays 306 are likely to be more closely tuned to the desired white light, contact with the light absorbing material 132 is avoided so that the light rays 306 do not take on a bluish tint. As mentioned above, the light absorbing material 132 may be a blue ink, blue dye, blue paint, blue film, or other blue colored material, or other material able to absorb yellow light wavelengths or other range of wavelengths desired to be absorbed. Some examples include UV-curable inks, air-curing inks, synthetic dyes, natural dyes, epoxies, and so forth. The light absorbing material 132 may be applied to the surface of the light guiding component 126 using any suitable technique, as previously enumerated above. Furthermore, while the light absorbing material 132 is shown only on the top surface of the light guiding component 126 in the example of FIGS. 2-3, in other examples, the light absorbing material 132 may also be, or may alternatively be, deposited on the bottom surface of the light guiding component 126.

In addition, FIG. 3 also illustrates an example configuration of the grating elements 310 that may be present in the light directing area 130, such as on the top surface, the bottom surface, or both, of the light guiding component 126. As one example, the grating elements 310 may increase in density in the direction of light travel away from the light sources 128. This can cause the light to be directed toward the display 102 in a uniform manner.

Figure 4A:
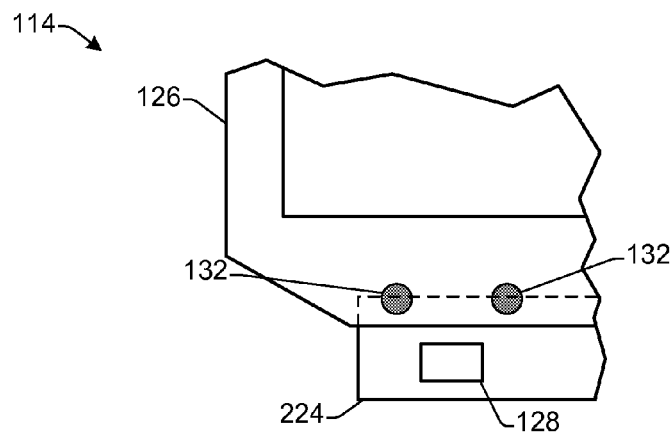
FIGS. 4A-4C illustrate partial plan views of a lighting apparatus including example configurations for light absorbing material according to some implementations.
Figure 4B:
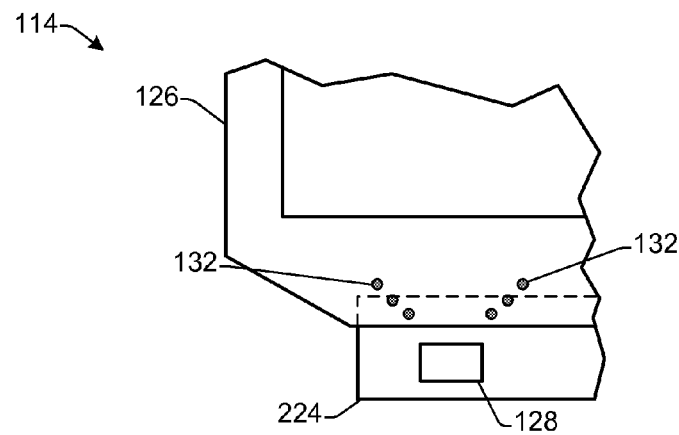
Figure 4C:
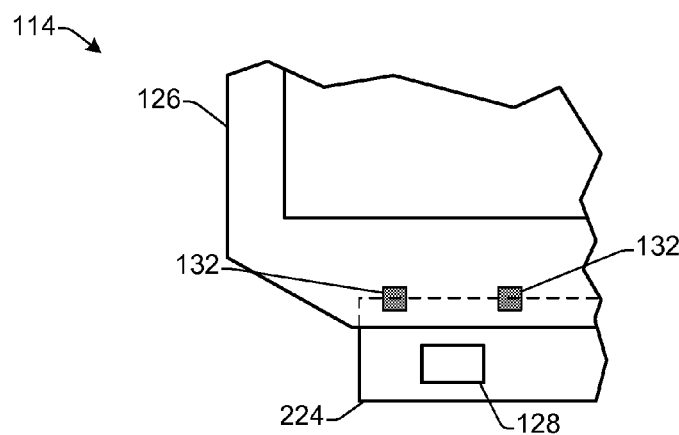

FIGS. 4A-4C illustrate example configurations of the light absorbing material according to some implementations. In the example of FIG. 4A, the light absorbing material 132 is configured as a pattern including two circular dots or patches of light absorbing material 132 per light source 128. The size and position of the circular patches may be dependent, at least in part on the amount of light to have a yellow constituent reduced. In the example of FIG. 4B, the light absorbing material 132 is configured as a pattern including a linear series of circles or dots positioned in-line along a path of the wider angle light rays emitted from the light source 128. The number of dots and the size may be dependent, at least in part, on the amount of light to have a yellow constituent reduced. In the example of FIG. 4C, the light absorbing material 132 is configured as a pattern including a square dot or patch positioned in-line along a path of the light rays emitted at wider angles from the light source 128. Further, while various shapes and configurations are shown in these examples, numerous other shapes and configurations may be employed.

Figure 5A:
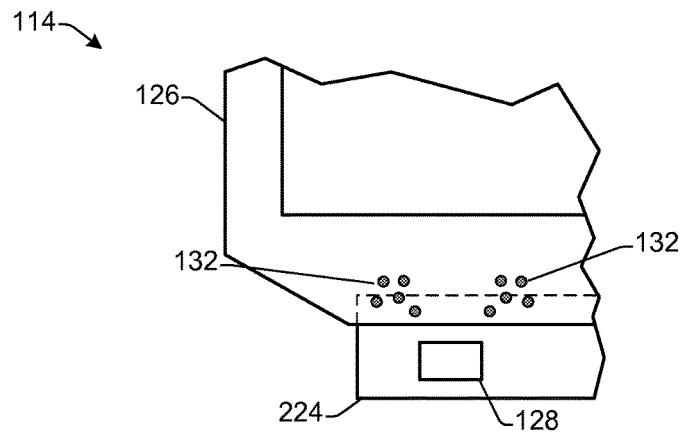
FIGS. 5A-5C illustrate partial plan views of a lighting apparatus including example configurations for light absorbing material according to some implementations.
Figure 5B:
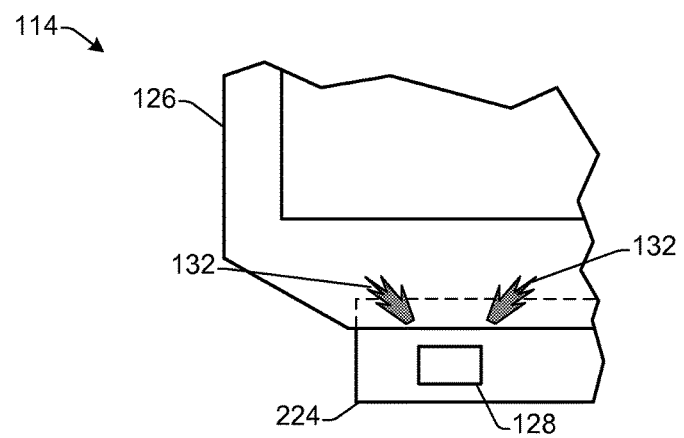
Figure 5C:
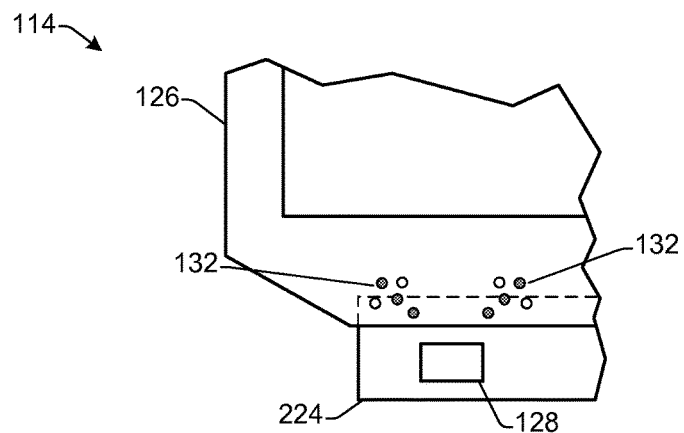

FIGS. 5A-5C illustrate examples configurations of the light absorbing material 132 according to some implementations. In the example of FIG. 5A, the light absorbing material 132 is configured as a plurality of dots or patches of light absorbing material 132. The dots may be in a random pattern, or arranged according to a predetermined or specified pattern. The size, position and number of the dots or patches may be dependent, at least in part on the amount of light that will have a yellow constituent reduced. In the example of FIG. 5B, the light absorbing material 132 is configured as a patch of material in an irregular configuration or pattern, such as resembling a splatter or flame, and positioned in-line along a path of the light rays emitted at larger angles from the light source 128. In the example of FIG. 5C, the light absorbing material 132 is configured as a pattern including a plurality of dots or patches of light absorbing material 132. The dots may be in a random pattern, or arranged according to a predetermined specified pattern, and in this example, some of the dots may be of a different color from others of the dots, such as for absorbing different ranges of wavelengths of light. For instance, depending on the type of LED used, and the desired overall lighting effect, various different colors of light absorbing material 132 may be used to absorb respective different ranges of wavelengths of light to achieve various different lighting effects.

Figure 6:
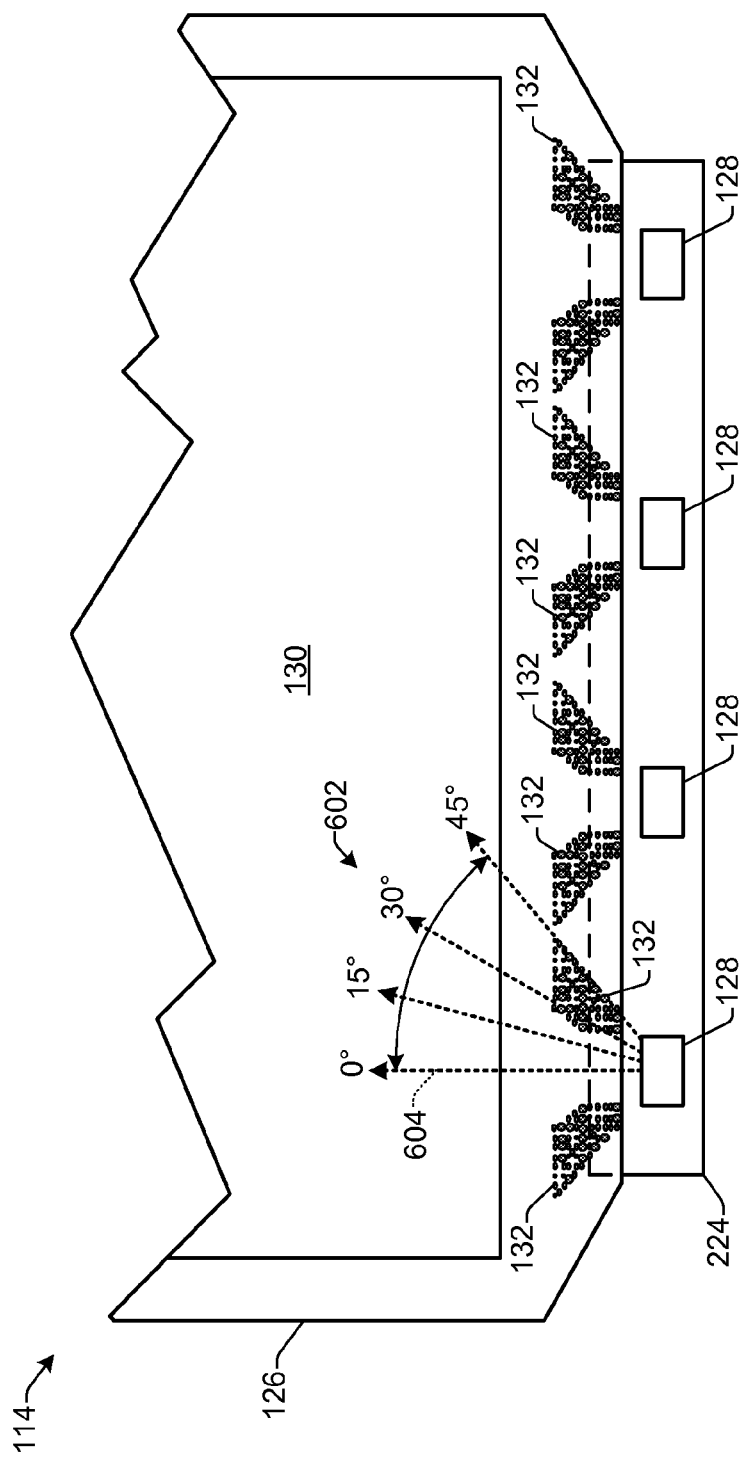
FIG. 6 illustrates a partial plan view of a lighting apparatus including an example configuration for light absorbing material according to some implementations.

FIG. 6 illustrates a partial plan view of a lighting apparatus according to some implementations. In this example, as illustrated by the light rays 602, the light source 128 is able to emit light at up to a 90-degree angle, i.e., 45 degrees off center on either side of a central axis of light travel 604 (i.e., 0 degree). Accordingly, as discussed above, the light source 128 may emit generally pure white light on central axis 604 of light ray travel, while the light emitted along the 45-degree angle of light ray travel may have a yellowish tinge due to passing through additional quantities of yellow phosphor within the light source 128.

Accordingly, the light absorbing material 132 is configured in a plurality of patterns, each including a plurality of dots or patches generally shaped as a trapezoid tilted at a 45 degree angle from horizontal and positioned offset from the central axis of light travel to have a larger quantity of light absorbing material 132 at the larger angles from center, and smaller quantities or no light absorbing material at the light path angles that are closer to the central axis 604. For example, the light traveling along the 45-degree light path is exposed to, and reflects off, a larger quantity of the light absorbing material 132 than the light moving along the 30-degree light path, while light moving along the 15-degree light path does not reflect off the light absorbing material 132 at all in this example. As mentioned above, the light path angles that may be covered by the light absorbing material can be determined based on an empirical determination of the light quality at various different angles for a particular brand or model of light source 128. In addition, the color, size, density and position of the light absorbing material can be further controlled to fine tune the light traveling within the light guiding component 126. Further, while several shapes, patterns and configurations for the light absorbing material 132 are shown as examples herein, any suitable shape, pattern or configuration may be used for the light absorbing material 132, depending on the amount of yellow light desired to be removed, or other lighting effects desired to be attained.

Figure 7:
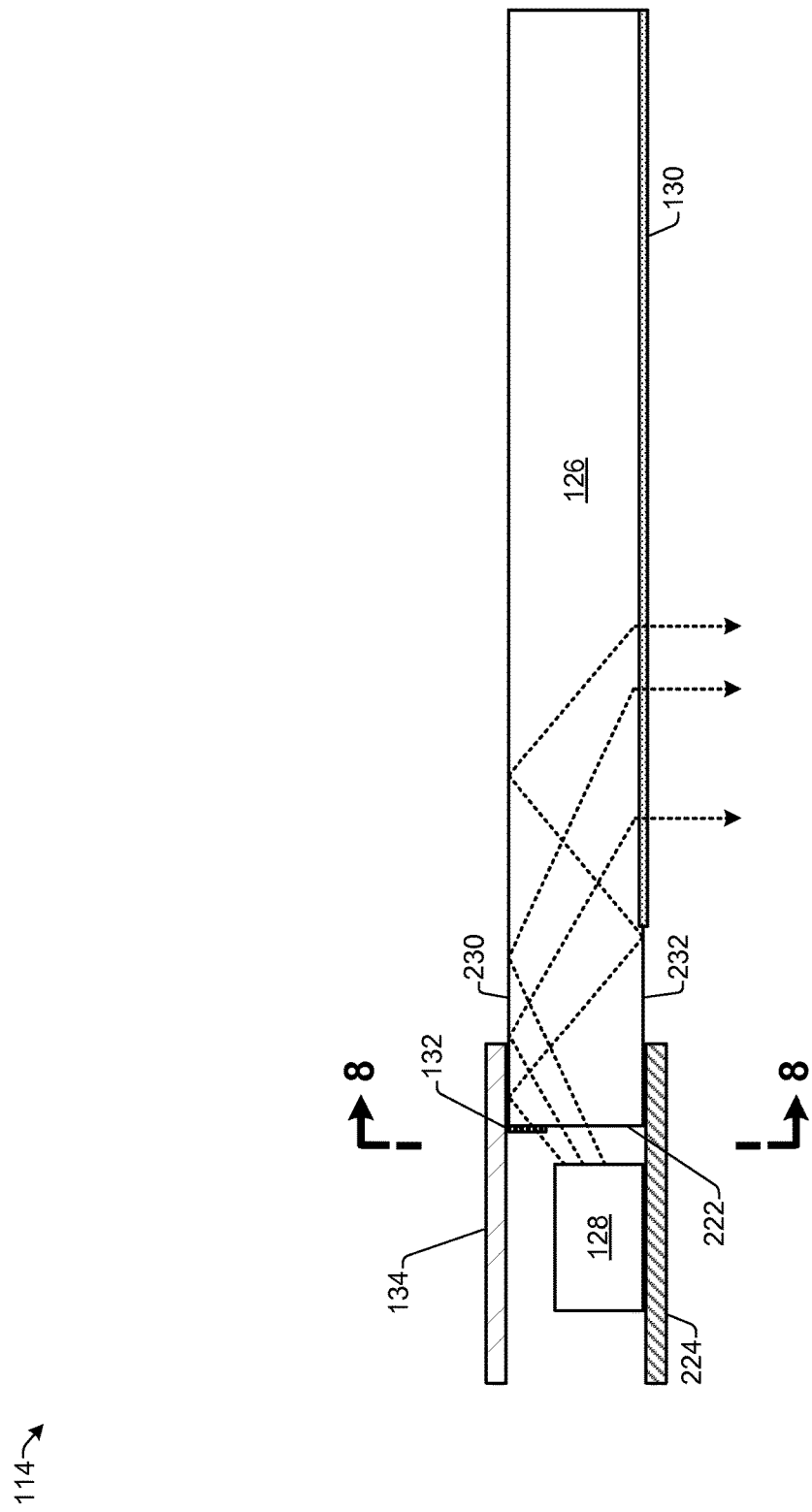
FIG. 7 illustrates a cross sectional view of a lighting apparatus including an example configuration for light absorbing material on an edge of a light guiding component according to some implementations.

FIG. 7 illustrates a cross-sectional view of an example of a lighting apparatus having the light absorbing material on an edge of a light guiding component according to some implementations. In this example, the light absorbing material 132 may be positioned on the edge 222 of the light guiding component 126 through which the light is received from the light source 128. For example, the light absorbing material 132 may be a translucent colored material such as a dye, ink, or the like that allows the light rays to pass through while filtering out the yellow wavelengths of light. The light absorbing material 132 may be applied to the edge 222 through any of the techniques enumerated above, and may be positioned to be impinged by the light rays emitted from the light source 128 at the wider angles from the central axis, as discussed above with respect to FIG. 6.

Figure 8:
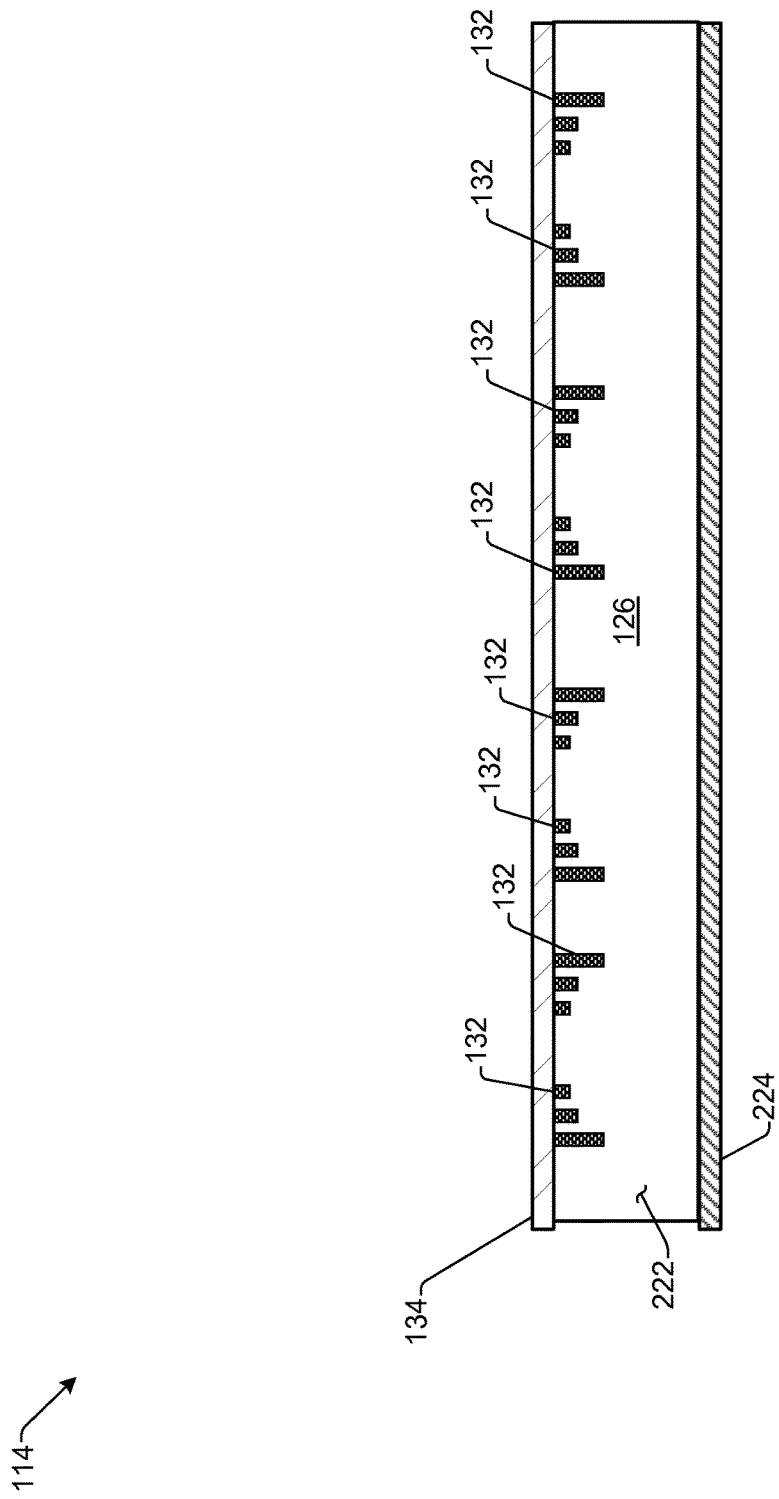
FIG. 8 illustrates an end view of the light guiding component of FIG. 7 as viewed along line 8-8 of FIG. 7 according to some implementations.

FIG. 8 illustrates an end view of the light guiding component of FIG. 7 as viewed along line 8-8 of FIG. 7 according to some implementations. The example of FIG. 8 illustrates one possible configuration for the light absorbing material 132, with larger amounts of light absorbing material 132 located in the areas that may be impinged by the light rays exiting the light source at the wider angles, and with progressively smaller amounts of light absorbing material 132 closer to where the central axis the light source 128 would be located. Accordingly, the light rays exiting the light source 128 having more yellow wavelengths will pass through the light absorbing material 132 to remove at least a portion of the yellow wavelengths, and to thereby reduce or eliminate any noticeable yellow lighting artifacts from the display.

Figure 9:
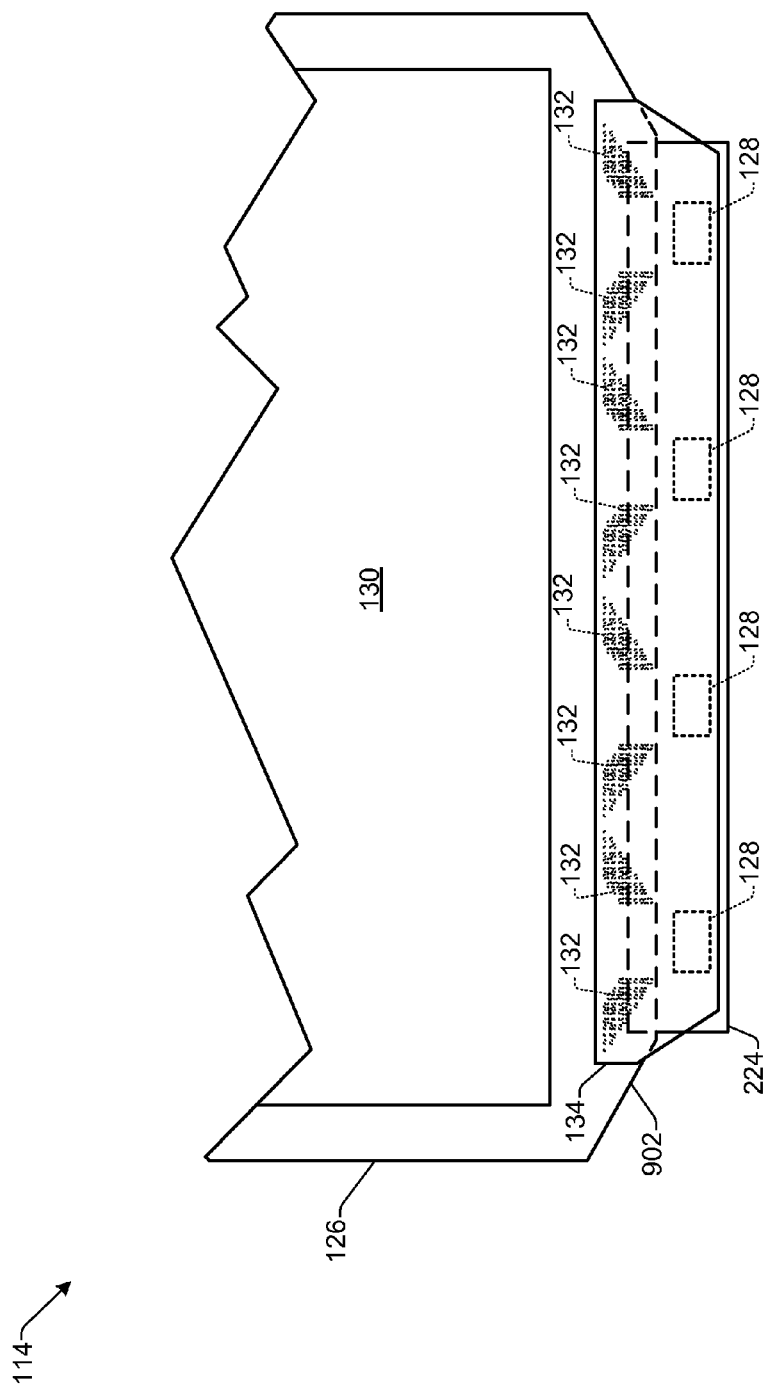
FIG. 9 illustrates a partial plan view of a lighting apparatus with a white tape or other reflective material disposed over light absorbing material according to some implementations.

FIG. 9 illustrates a partial plan view of a lighting apparatus according to some implementations. In this example, the reflective material 134 may comprise a piece of white tape, as described above, that is placed over the patterns of light absorbing material 132 and the light sources 128 along a lower edge area 902 of the light guiding component 126. Accordingly, the reflective material 134 may serve to reflect and/or diffuse the light emitted by the light sources 128, such as for reducing the presence of bright spots or dark spots in the illumination of the display 102. Furthermore, as discussed above, the light absorbing material 132 may reduce or render unnoticeable any yellow patterns or yellow artifacts caused by the wider-angle light rays emitted from the light sources 128. Additionally, as also mentioned above, in some examples the particular color or shade of the reflective material 134 may be controlled to further fine tune the coloration of the light emitted into the light guiding component 126. For example, if the light includes a bluish tinge, the reflective material 134 may include a more yellowish coloration to offset and rectify the bluish tinge.

Furthermore, while a piece of white tape is described as the reflective material 134 used in this example, and in the examples of FIGS. 10-14, in other implementations, the reflective material 134 may be a coating or layer of reflective material having reflective and/or light diffusing properties similar to those of the white tape, and that is deposited, printed, or otherwise disposed on the lower edge area 902 of the light guiding component 126, such as adjacent to or in line with the light sources 128. Additionally, in some examples, the reflective material 134 may also be placed on the bottom surface of the light guiding component 126, such as between the FPC 224 and the bottom surface of the light guiding component 126.

Figure 10:
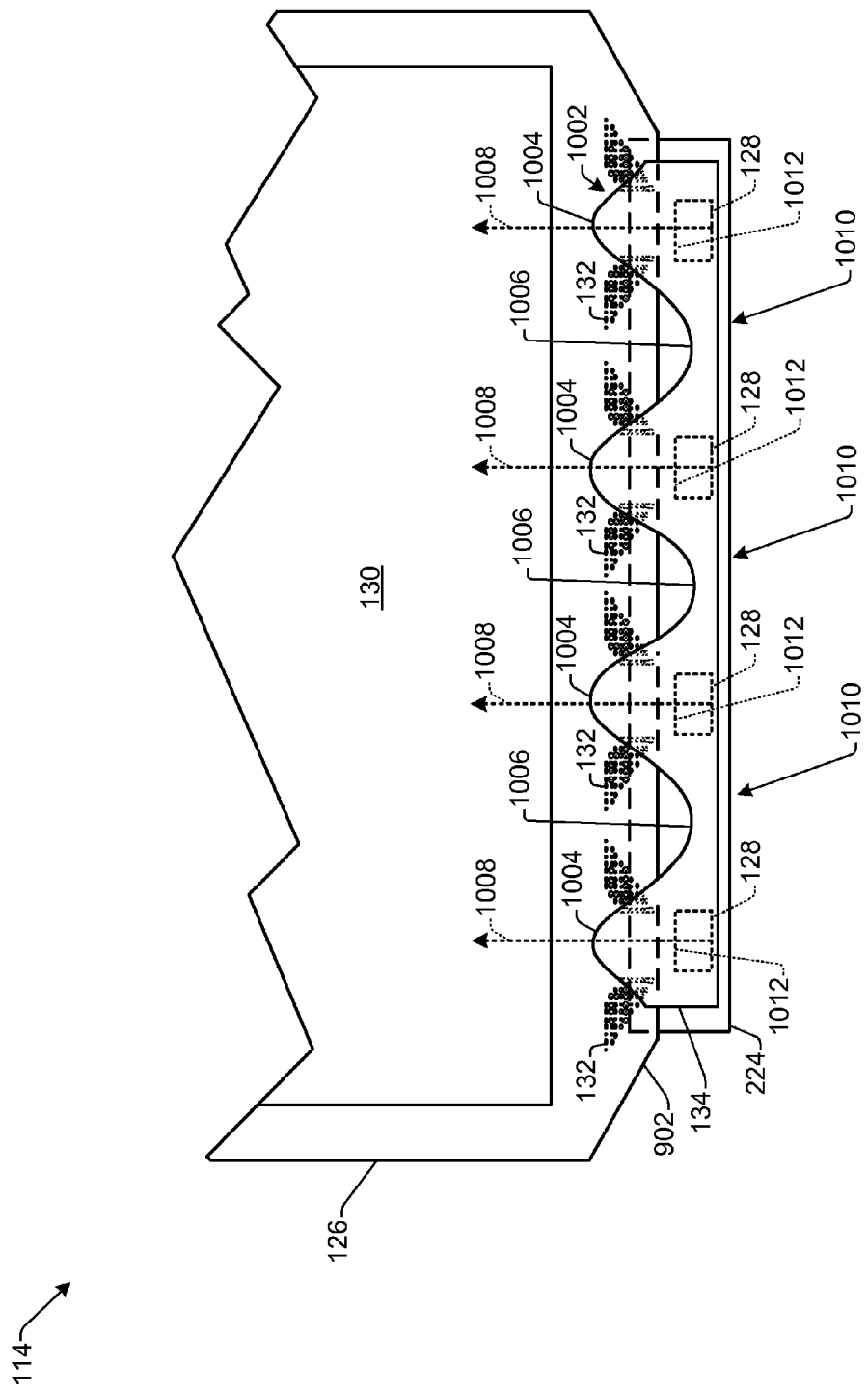
FIG. 10 illustrates a partial plan view of a lighting apparatus with a white tape or other reflective material shaped to provide a desired light distribution according to some implementations.

FIG. 10 illustrates a partial plan view of a lighting apparatus according to some implementations. In this example, the reflective material 134 may comprise a piece of white tape that has been die-cut or otherwise cut or shaped to achieve desired light distribution properties for controlling the uniformity of the light reflected onto the display 102. In this example, a forward edge 1002 of the reflective material 134 that faces in the same direction as the direction of light travel overlies the bottom edge area 902 of the light guiding component 126, and is shaped to have a generally sinusoidal shape or wave shape having a plurality of peaks 1004 and troughs 1006. For instance, the peaks 1004 coincide with the light travel direction central axes 1008 of the light sources 128, while the troughs 1006 are located centrally in side areas 1010 between the light sources 128. This configuration can cause a greater reflection and/or diffusion of the light in the higher intensity locations such as along the central axes 1008 of light travel of the light sources, while providing no reflection and/or diffusion, or less reflection and diffusion, in the side areas 1010 between the light sources 128. In some cases, the central axis of light travel is normal to a surface 1012 of the light source 128 when viewed in plan, as in the example of FIG. 10. Accordingly, the configuration of FIG. 10, in some cases, may achieve a greater uniformity of light distribution than may be the case with the white tape configuration discussed above with respect to FIG. 9.

Additionally, in some examples, the reflective material 134 may also be placed on the bottom surface of the light guiding component 126 such as between the FPC 224 and the bottom surface of the light guiding component 126. Further, in some cases, the reflective material 134 on the bottom surface may have a different shape or configuration than the reflective material 134 on the top surface of the light guiding component 126.

Figure 11:
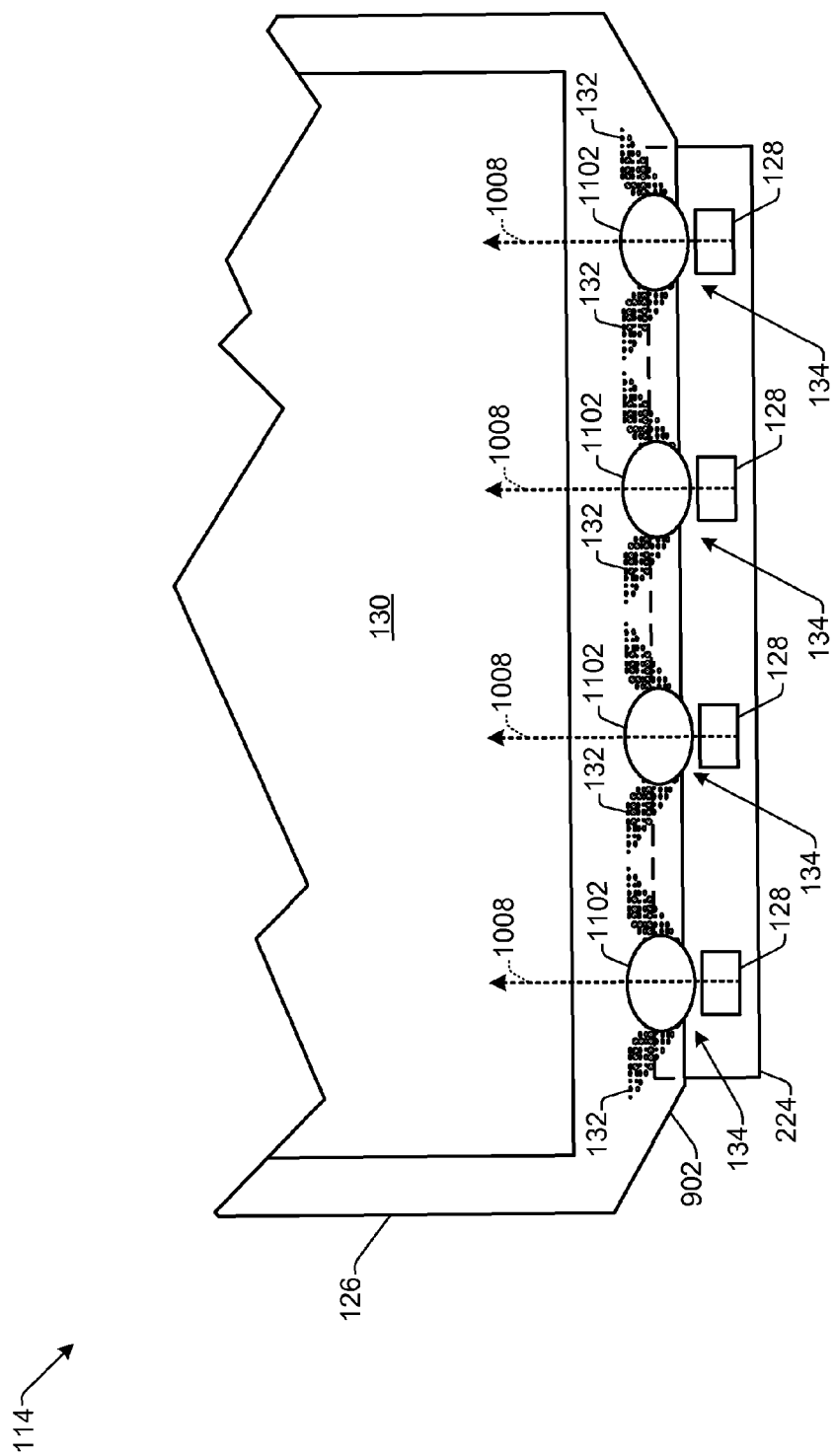
FIG. 11 illustrates a partial plan view of a lighting apparatus with a white tape or other reflective material shaped to provide a desired light distribution according to some implementations.

FIG. 11 illustrates a partial plan view of a lighting apparatus according to some implementations. In this example, the reflective material 134 comprises a plurality of individual pieces 1102 of white tape that have been die-cut or otherwise cut or shaped to achieve desired light distribution properties for controlling the uniformity of the light reflected onto the display 102. For instance, each individual piece 1102 of white tape may be in the shape of an oval or circle that is placed to coincide with the central axis 1008 of the light emitted from a respective light source 128. Similar to the example of FIG. 10, by placing the diffusive and/or reflective material 134 and this location, the higher intensity light emitted along the central axis 1008 of the light source 128 is subject to a greater amount of diffusion and reflection than the light emitted toward the sides of the light sources 128. Consequently, the configuration of FIG. 11 may be able to achieve a greater overall uniformity of light distribution than, for example, the configuration of FIG. 9. Furthermore, the light absorbing material 132 may be included in some examples to reduce or remove any yellow tinge imparted by the larger angle light rays.

Furthermore, while a plurality of pieces 1102 of white tape are described as the reflective material 134 used in this example, in other examples the reflective material 134 may be a coating or layer of reflective material having reflective and/or light diffusing properties similar to those of the white tape, and that is deposited, printed, or otherwise disposed on the lower edge area 902 of the light guiding component 126 in a similar configuration. Additionally, in some examples, the reflective material 134 may also be placed on the bottom surface of the light guiding component 126 such as between the FPC 224 and the bottom surface of the light guiding component 126, and may have the same shape or a different shape.

Figure 12A:
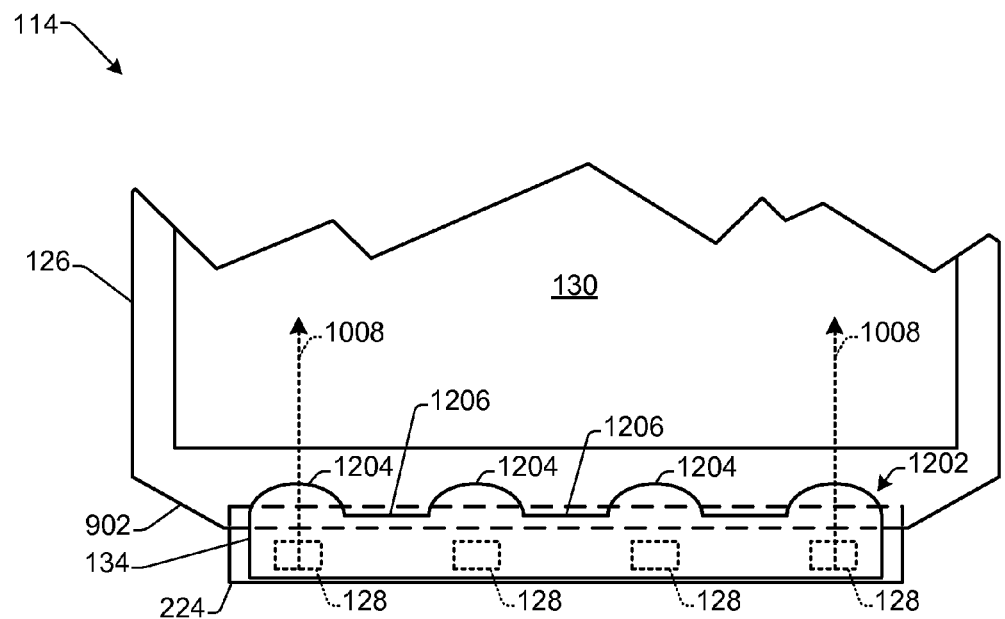
FIGS. 12A and 12B illustrate example configurations for shaping white tape or other reflective material to provide a desired light distribution according to some implementations.
Figure 12B:
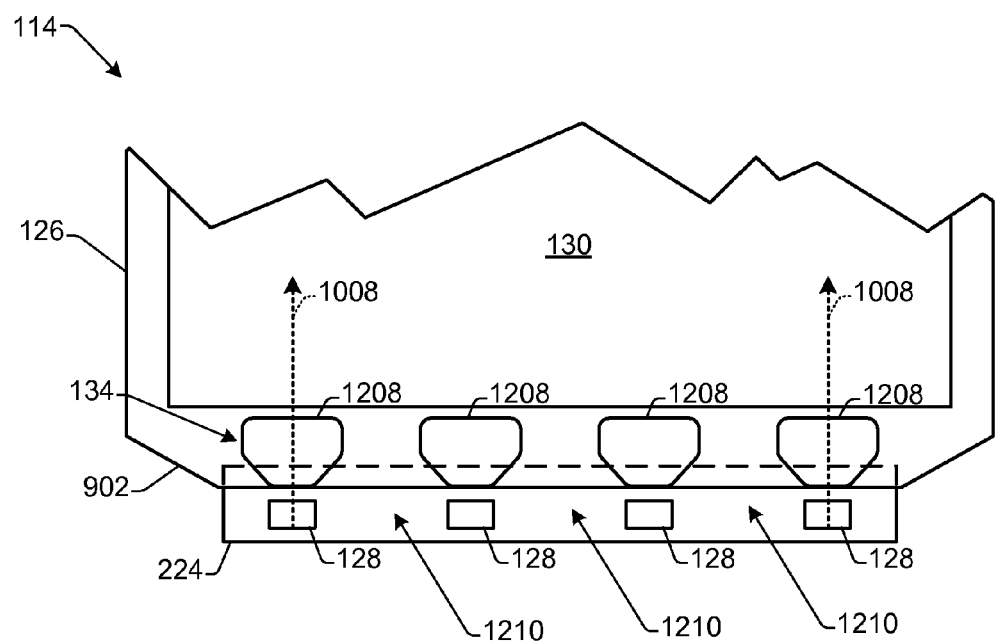

FIGS. 12A and 12B illustrate partial plan views of a lighting apparatus according to some implementations. In the example of FIG. 12A, the reflective material 134 may comprise a piece of white tape that has been die-cut or otherwise cut or shaped to achieve desired light distribution properties for controlling the uniformity of the light reflected onto the display 102. In this example, a forward edge 1202 of the reflective material 134 that faces the direction of light travel is shaped to have a plurality of peaks 1204 and flat areas 1206 in the area between the light sources 128. For instance, the peaks 1204 coincide with the light ray central axes 1008 of the light sources 128, while the flat areas 1206 are located centrally between the light sources 128. This configuration can cause a greater reflection and/or diffusion of the light in the higher intensity locations such as along the central axes or centerlines of the light sources, while providing no or less reflection and/or diffusion in the side areas between the light sources 128.

FIG. 12B illustrates partial plan view of an example of the lighting apparatus 114 according to some implementations. In this example, the reflective material 134 comprises a plurality of individual pieces 1208 of white tape that have been die-cut or otherwise cut or shaped to achieve desired light distribution properties for controlling the uniformity of the light reflected onto the display 102. For instance, each individual piece 1208 of white tape may be generally in the shape of an inverted trapezoid that is placed to coincide with the central axis 1008 of the light emitted from a respective light source 128. Similar to the example of FIG. 11, by placing the diffusive and/or reflective material 134 at this location, the higher intensity light emitted along the central axis 1008 of the light source 128 is subject to a greater amount of diffusion and reflection than the light emitted toward the side areas 1210 between the light sources 128.

Figure 13A:
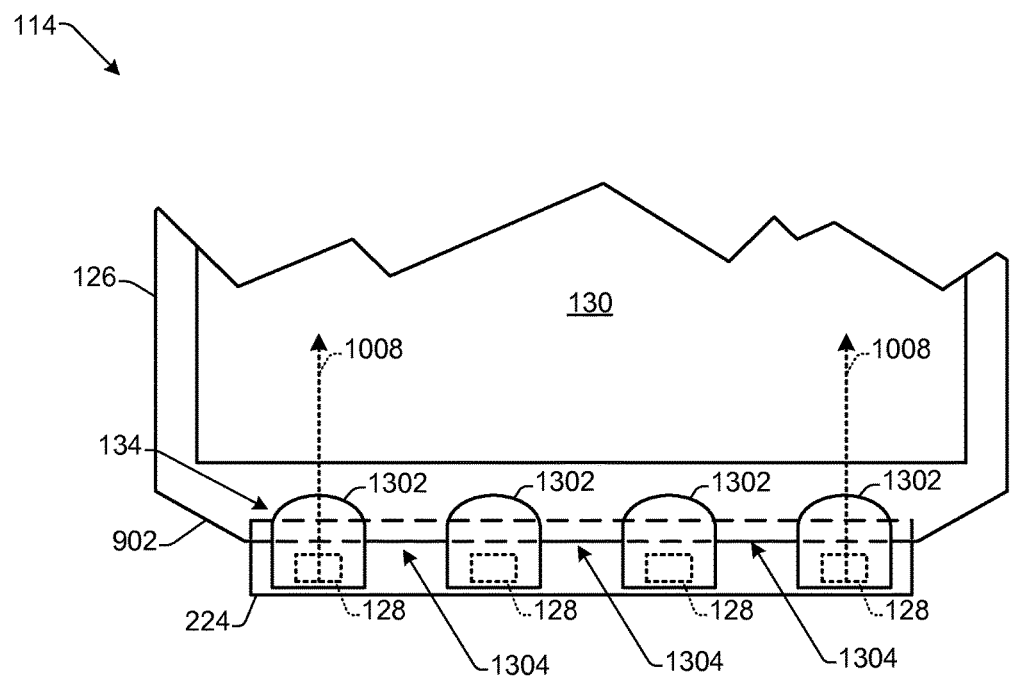
FIGS. 13A and 13B illustrate example configurations for shaping white tape or other reflective material to provide a desired light distribution according to some implementations.
Figure 13B:
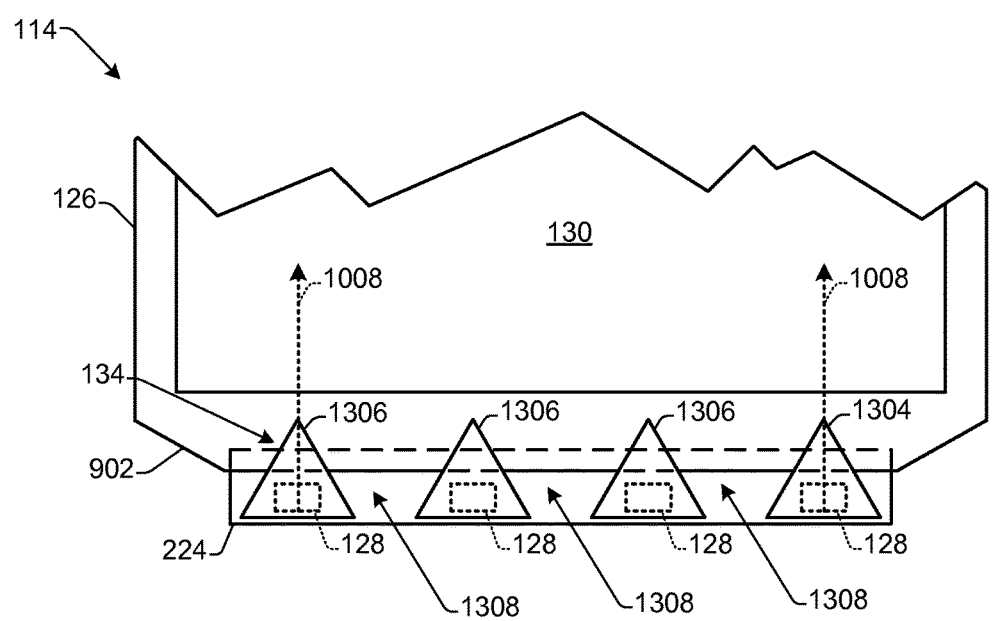

FIGS. 13A and 13B illustrate partial plan views of example lighting apparatuses according to some implementations. In the example of FIG. 13A, the reflective material 134 comprises a plurality of individual pieces 1302 of white tape that have been die-cut or otherwise cut or shaped to achieve desired light distribution properties for controlling the uniformity of the light reflected onto the display 102. For instance, each individual piece 1302 of white tape may be generally in the shape of a rectangle having a rounded top portion that is placed to coincide with the central axis 1008 of the light emitted from a respective light source 128. Similar to the example of FIG. 11, by placing the diffusive and/or reflective material 134 at this location, the higher intensity light emitted along the central axis 1008 of the light source 128 is subject to a greater amount of diffusion and reflection than the light emitted toward the side areas 1304 between the light sources 128.

In the example of FIG. 13B, the reflective material 134 comprises a plurality of individual pieces 1306 of white tape that have been die-cut or otherwise cut or shaped to achieve desired light distribution properties for controlling the uniformity of the light reflected onto the display 102. For instance, each individual piece 1302 of white tape may be generally in the shape of a triangle having a tip portion that is placed to coincide with the central axis 1008 of the light emitted from a respective light source 128. Similar to the example of FIG. 11, by placing the diffusive and/or reflective material 134 at this location, the higher intensity light emitted along the central axis 1008 of the light source 128 is subject to a greater amount of diffusion and reflection than the light emitted toward the side areas 1308 between the light sources 128.

Figure 14:
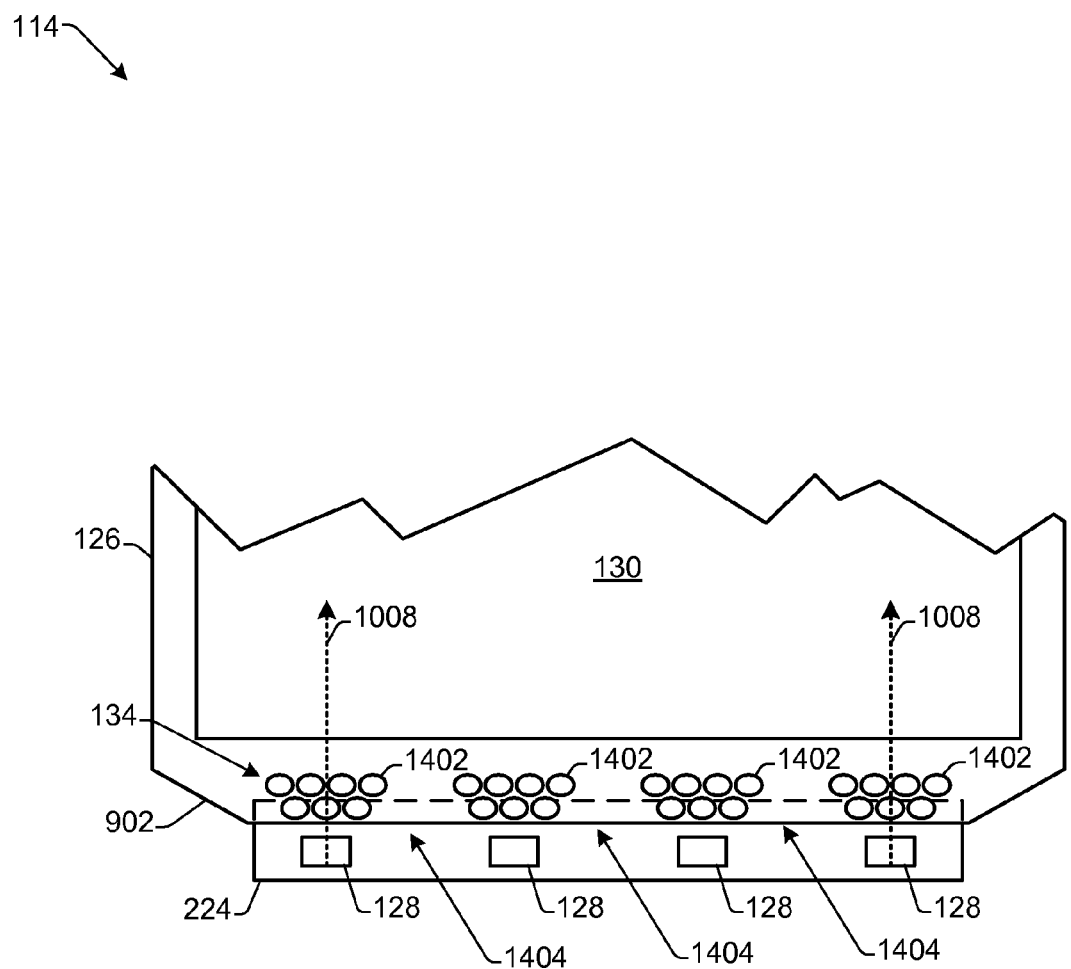
FIG. 14 illustrates an example configuration for shaping white tape or other reflective material to provide a desired light distribution according to some implementations.

FIG. 14 illustrates a partial plan view of an example lighting apparatus according to some implementations. In the example of FIG. 14, the reflective material 134 comprises a plurality of individual pieces 1402 of white tape that have been die-cut or otherwise cut or shaped to achieve desired light distribution properties for controlling the uniformity of the light reflected onto the display 102. For instance, each individual piece 1402 of white tape may be generally in the shape of a circle of oval, and a plurality of the circles or ovals (e.g., 7 in this example) may be placed to coincide with the central axis 1008 of the light emitted from a respective light source 128. Similar to the example of FIG. 11, by placing the diffusive and/or reflective material 134 at this location, the higher intensity light emitted along the central axis 1008 of the light source 128 is subject to a greater amount of diffusion and reflection than the light emitted toward the side areas 1404 between the light sources 128. In addition, while the configurations of FIGS. 12-14 do not illustrate use of the light absorbing material 132, in other implementations, any of the configurations of the light absorbing material 132 described above with respect to FIGS. 2-11, or in any other suitable configuration, may be employed with the configurations of FIGS. 9-14.

FIGS. 15A-15C illustrate cross sectional views of example configurations of the light absorbing material and the reflective material on a lighting apparatus according to some implementations. In the example of FIG. 15A, the lighting apparatus 114 includes the light absorbing material 132 disposed on both the top surface 230 of the lightguide 126 and the bottom surface 232 of the lightguide 126. For example, the light absorbing material applied to the bottom surface 232 may have the same configuration or different configurations from the light absorbing material 132 applied to the top surface 230. Furthermore, the flexible printed circuit (FPC) 224 may include an top surface 1502 that is disposed facing the bottom surface 232 of the lightguide 126. In some examples, the top surface 1502 of the FPC 224 may be processed or coated to have similar properties to the white tape or other reflective material 134. Accordingly, in some examples, the top surface 1502 of the flexible printed circuit 224 may serve as the reflective material 134.

FIG. 15B illustrates another example of the lighting apparatus 114 according to some implementations. In the example of FIG. 15B, one or more additional pieces of white tape or other reflective material 134 are disposed between the FPC 224 and the bottom surface 232 of the light guide material. For instance, the reflective material 134 disposed on the bottom surface 232 of the lightguide 126 may have the same configuration as the reflective material 134 disposed on the top surface 230 of the lightguide, or may have a different configuration, such as a different shape, different pattern, different thickness, different coloration, and so forth, as may be suitable for achieving a desired effect on the light to the reflected within the lightguide 126. In addition, in this example, the light absorbing material 132 located on the bottom surface 232 of the lightguide 126 has a different configuration from the reflective material 132 located on the top surface 230. For example, the reflective material may differ in at least one of a pattern, a position, a color, a thickness, and so forth.

FIG. 15C illustrates another example of the lighting apparatus 114 according to some implementations. In the example of FIG. 15C, the white tape or other reflective material 134 is disposed between the FPC 224 and the bottom surface 232 of the light guiding component 126, but the reflective material 134 is not disposed on the top surface 230 of the light guiding component 126 in this example. In addition, the light absorbing material 132 may be disposed on the top surface 230, the bottom surface 232 and/or on the edge 222 of the light guiding component 126. For example, the light absorbing material 132 in each location may differ in at least one of a pattern, an offset, a color, a thickness, and so forth. Furthermore, while several example implementations have been shown and described herein, numerous other examples and variations will be apparent to those of skill in the art having the benefit of the disclosure herein.

Figure 16:
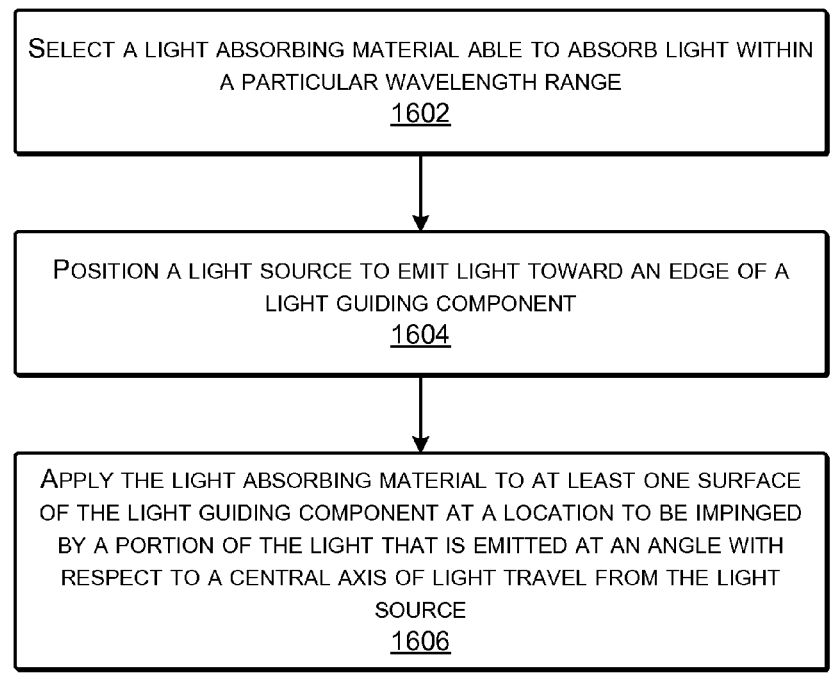
FIG. 16 is a flow diagram of an example process for controlling lighting color and uniformity according to some implementations.

FIG. 16 illustrates an example process 1600 for assembling at least a portion of the lighting apparatus according to some implementations. The order in which the operations are described is not intended to be construed as a limitation, and several of the described operations can be combined in any order and/or in parallel to implement the process.

At 1602, the process includes selecting a light absorbing material able to absorb light within a particular wavelength range. For example, a control group of LEDs may be tested to determine the amount of yellow light emitted at various angles between the widest angle and the central axis. Based on this information, the location and density of the light absorbing material may be determined and a suitable light absorbing material may be selected. In some examples, the light absorbing material may have a color that is able to absorb wavelengths of light within a particular range of wavelengths. As one example, the light absorbing material be a blue color able to absorb yellow wavelengths of light (e.g., in the wavelength range of 530-580 nm). However, for other types of light sources, such as other colors of LEDs, other types or colors of light absorbing materials by be employed.

At 1604, the process includes positioning a light source to emit light toward an edge of a light guiding component. For example, one or more light sources, such as LEDs or other suitable light sources may be aligned with at least one edge of a light guiding component for emitting light into the edge of the lightguide substrate. In some examples, the one or more light sources may be mounted on a flexible printed circuit that is also coupled to the light guiding component.

At 1606, the process includes applying the light absorbing material to at least one surface of the light guiding component at a location to be impinged by a portion of the light that is emitted at an angle with respect to a central axis of light travel from the light source. For example, the light absorbing material may be applied to at least one of an top surface or a bottom surface of the light guiding component, such as adjacent to or in close proximity to the edge through which the light enters the light guiding component. Further, the location of the light absorbing material may be offset from the central axis of the light source, such as at an angle of 20-60 degrees, or other suitable angles, depending on the field of illumination of the light source. Further, in some cases, no light absorbing material is located along the central axis of light travel or at smaller angles, such as within 20 degrees of the central axis. Alternatively, or additionally, the light absorbing material may be applied to the edge of the light guiding component through which the light enters the light guiding component. The light absorbing material may be applied by at least one of printing, dying, coating or depositing the light absorbing material onto the at least one surface of the light guiding component. For instance, the light absorbing material may be in a location with respect to the light source such that the wider angle light rays impinge on the light absorbing material to remove a yellow wavelength constituent from the wider angle light rays. In the case that the light absorbing material is applied to the top or bottom surface of the light guiding component, the wider angle light rays may reflect off the light absorbing material inside of the light guiding component. In the case that the light absorbing material is applied to the edge of the light guiding component, the wider angle light rays may pass through a portion of the light absorbing material when entering the light guiding component. Furthermore, in some examples, the reflective material discussed above may be applied to the light guiding component in conjunction with the light absorbing material, such as for reflecting and/or diffusing the light from the light sources to provide greater uniformity of light distribution.

Figure 17:
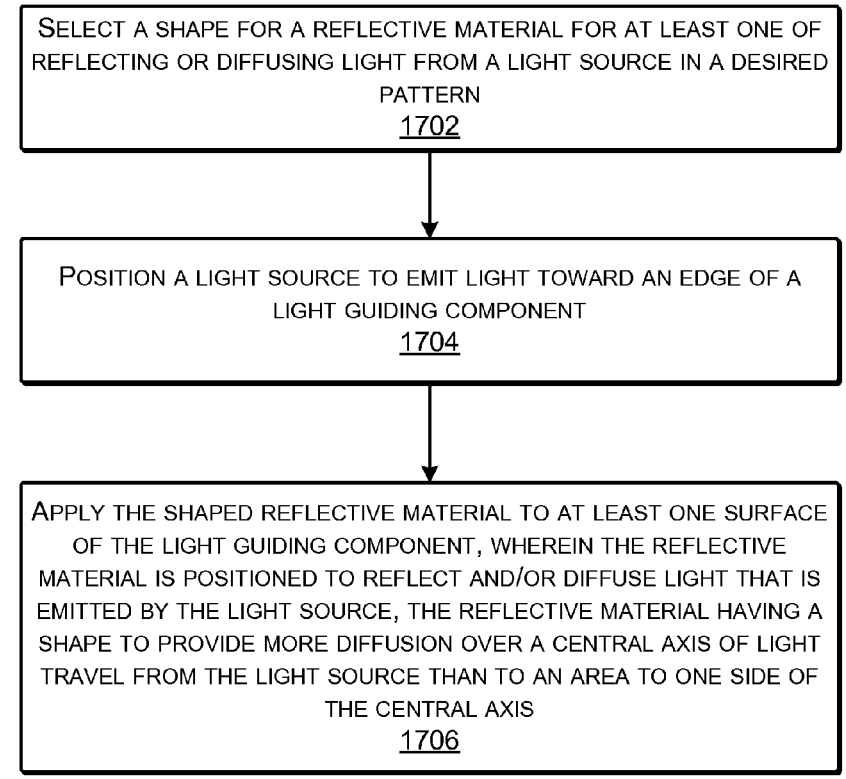
FIG. 17 is a flow diagram of an example process for controlling lighting color and uniformity according to some implementations.

FIG. 17 illustrates an example process 1700 for assembling at least a portion of the lighting apparatus according to some implementations. The order in which the operations are described is not intended to be construed as a limitation, and several of the described operations can be combined in any order and/or in parallel to implement the process.

At 1702, the process includes selecting a shape for a reflective material for reflecting and/or diffusing light from a light source in a desired pattern or light distribution. For instance, any of various shapes may be selected for the reflective material to cause a more uniform distribution of the light from one or more light sources than would be the case if the shaped reflective material was not present. As one example, the selected shape may include placement of a larger portion of the reflective material may be located over the central axis of light travel for each respective light source, as the light is typically most intense at this location. Thus, the shape may be tuned to cause the most reflection and/or diffusion at this location.

Additionally, in some examples, the selecting may further include selecting a color for the reflective material. For example, a control group of LEDs may be tested to determine the purity of white light emitted by the LEDs along a central axis of light travel. If the light has a bluish tinge, the color of the reflective material may be more yellow, whereas if the light has a yellowish tinge, the color of the reflective material may be bluer.

At 1704, the process includes positioning a light source to emit light toward an edge of a light guiding component. For example, one or more light sources, such as LEDs or other suitable light sources may be aligned with at least one edge of a light guiding component for emitting light into the edge of the lightguide substrate. In some examples, the one or more light sources may be mounted on a flexible printed circuit that is also coupled to the light guiding component.

At 1706, the process includes applying the shaped reflective material to at least one surface of the light guiding component. For example, the reflective material is positioned to reflect and/or diffuse light that is emitted by the light source, the reflective material may have a shape that is selected to provide more diffusion over a central axis of light travel from the light source than in at least one area to the side of the central axis. In some examples, the reflective material may be a white tape that is cut or otherwise shaped into the desired shape. In other examples, the reflective material may be applied to the surface such as by at least one of printing, coating or depositing the reflective material onto the at least one surface of the light guiding component. As one example, the shape of the reflective material may include one or more peaks that extend further forward over the central axis than a remainder of the reflective material. As another example, the shape of the reflective material may include a plurality of individual pieces of reflective material positioned over the central axis of the one or more light sources. The reflective material may be applied to at least one of the top surface or the bottom surface of the light guiding component, such as in the area adjacent to the edge where the light source is located. Additionally, the reflective material applied to the top surface may have a different configuration or shape from the reflective material applied to the bottom surface for achieving various different types of light reflection and/or diffusion patterns. Furthermore, in some examples the light absorbing material discussed above may also be applied to the light guiding component in conjunction with the reflective material, such as for reducing yellow artifacts that may occur in the light.

Figure 18:
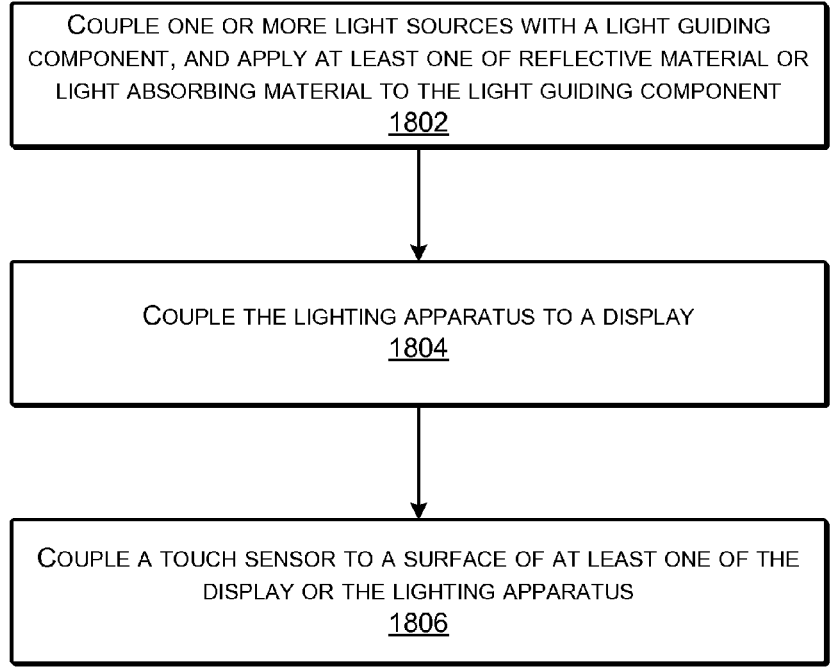
FIG. 18 is a flow diagram of an example process an example process for assembling an electronic device including at least a display and a lighting apparatus according to some implementations.

FIG. 18 illustrates an example process 1800 for assembling an electronic device 100 including at least the display 102 and the lighting apparatus 114 in a stack to form a display assembly as described herein. The order in which the operations are described is not intended to be construed as a limitation, and any number of the described operations can be combined in any order and/or in parallel to implement the process.

At 1802, the process includes coupling one or more light sources with a light guiding component, such as using the processes discussed above with respect to FIGS. 16 and/or 17. For instance, one or more LEDs may be coupled to a flexible printed circuit (FPC), such as by engaging electrical contacts on the FPC with electrical contacts on the LED. Many variations of such electrical interconnections exist, including but not limited to through-hole soldering, surface mount soldering, mechanical contacts or the like. The FPC may further be coupled to a surface of the light guiding component with or without reflective material being located between the FPC and the surface of the light guiding component. At least one of the light absorbing material or the reflective material may be applied to the light guiding component as discussed above with respect to the process 1600 of FIG. 16 and the process 1700 of FIG. 17, respectively. The order in which the LEDs are coupled to the FPC, the FPC is coupled to the light guiding component, and the light absorbing material and/or the reflective material are applied or coupled together may be performed in any desired order and implementations herein are not constrained by any particular order.

At 1804, the process may include coupling the lighting apparatus to the display. For example, the lighting apparatus may be coupled to a protective sheet of the display using an OCA, such as a liquid or solid OCA. As one example, this may include depositing and curing a layer of LOCA atop the protective sheet of the display, and laying the lighting apparatus atop the LOCA. The display may be any of the types of display discussed above such as a front lit or backlit display. For instance in the case of a backlit display, the LOCA may be first applied to the lighting apparatus and the display may then be placed atop the lighting apparatus.

At 1806, the process includes coupling a touch sensor to a surface of at least one of the display or the lighting apparatus, such with a solid or liquid OCA. For example, in the case of a front lit display, the touch sensor may be coupled to an top surface of the lighting apparatus, on a side opposite to the display. Alternatively, in the case of a backlit display, the touch sensor may be coupled to an top surface of the display, on a side of the display opposite to the lighting apparatus. In some examples, the touch sensor may be integral with a cover layer or outer protective sheet, while in other examples, the cover layer may be applied subsequently using an additional layer of OCA. One or more of the blocks in FIG. 18 may be optional, as a function of the structure and application(s) of the electronic device. For example, having a touch sensor may be an option, and a display according to the disclosure may be implemented with or without a touch sensor and/or other components. Further, in other examples, the touch sensor may be coupled in between the lighting apparatus and the display.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    positioning a light source to emit light toward an edge of a light guiding component having the edge, a top surface, and a bottom surface; and
    applying a light absorbing material to at least the edge of the light guiding component at a first location to be impinged by a first portion of the light that is emitted at an angle with respect to a central axis of light travel from the light source, wherein:
        the central axis is generally normal to a surface of the light source;
        a larger quantity of the light absorbing material is applied to the edge at the first location than to the edge at a second location to be impinged by a second portion of the light that is emitted at the central axis of the light travel; and
        the light absorbing material absorbs light within a particular wavelength range for adjusting a color of the light.

2. The method as recited in claim 1, wherein applying the light absorbing material further comprises applying the light absorbing material in at least one pattern that includes at least one of:
    a single dot or patch of the light absorbing material;
    multiple dots or patches of the light absorbing material disposed in a random pattern; or
    multiple dots or patches of the light absorbing material disposed in a linear pattern or other specified pattern.

3. The method as recited in claim 1, wherein the light absorbing material is configured to absorb at least some yellow wavelengths of the light emitted by the light source at the angle for adjusting a color of the light toward a desired color.

4. The method as recited in claim 1, further comprising applying the light absorbing material to at least one of the top surface or the bottom surface of the light guiding component, adjacent to the edge of the light guiding component, and offset from the central axis of the light travel from the light source.

5. The method as recited in claim 1, wherein applying the light absorbing material comprises at least one of printing, dying, painting, coating or depositing the light absorbing material onto the edge.

6. The method as recited in claim 1, wherein the edge is arranged bordering the top surface and bordering the bottom surface.

7. An apparatus comprising:
    a light source configured to emit light at least along a central axis of light travel generally normal to a surface of the light source;
    a light guiding component having an edge spaced apart from the light source along the central axis and configured to receive the light from the light source;
    a light absorbing material located on the edge of the light guiding component, wherein a larger quantity of the light absorbing material is located on the edge at a first location corresponding to an angle from the central axis of the light travel than is located on the edge at a second location corresponding to the central axis of the light travel, wherein the light absorbing material is configured to absorb at least a portion of the light within a particular range of wavelengths; and
    a reflective material on a surface of the light guiding component adjacent to the edge.

8. The apparatus as recited in claim 7, further comprising a second light absorbing material located on the light guiding component on at least one of a top surface or a bottom surface of the light guiding component.

9. The apparatus as recited in claim 7, wherein:
    the light source comprises a light emitting diode that includes a phosphor to provide light of a desired color; and
    the light absorbing material absorbs light at least in a wavelength generated by the phosphor.

10. The apparatus as recited in claim 7, wherein the light absorbing material includes at least a first light absorbing material of a first color for absorbing a first range of wavelengths and a second light absorbing material of a second color for absorbing a second range of wavelengths.

11. The apparatus as recited in claim 7, wherein the reflective material includes at least one of a specular reflective surface or a diffusive reflective surface facing the surface of the light guiding component.

12. The apparatus as recited in claim 7, further comprising an electronic display coupled to the light guiding component;
    wherein the light guiding component is configured to direct the light from the light source out of the light guiding component toward the electronic display for illuminating the electronic display.

13. The apparatus as recited in claim 7, wherein the light absorbing material is configured in at least one pattern on the light guiding component, wherein the at least one pattern includes at least one of:
    a single dot or patch of the light absorbing material;
    multiple dots or patches of the light absorbing material disposed in a random pattern; or multiple dots or patches of the light absorbing material disposed in a linear pattern or other specified pattern.

14. The apparatus as recited in claim 7, wherein the edge is arranged at least in part along a path of the light travel between the light source and at least one of a top surface or a bottom surface of the light guiding component.

15. The apparatus as recited in claim 7, wherein no light absorbing material is located on the edge at the second location corresponding to the central axis of the light travel.

16. An electronic device comprising:
- a light guiding component comprising a surface and comprising an edge configured to receive light;
- a first light source positioned to emit first light toward the edge;
- a second light source spaced apart from the first light source and positioned to emit second light toward the edge; and
- a light absorbing material arranged over the surface, a greater amount of the light absorbing material overlying a side area arranged laterally between a central axis of light travel of the first light and a central axis of light travel of the second light than overlying a central area arranged along the central axis of the light travel of the first light.

17. The electronic device as recited in claim 16, wherein the light absorbing material includes at least one pattern, the at least one pattern comprising at least one of:
- a single dot or patch of the light absorbing material;
- multiple dots or patches of the light absorbing material disposed in a random pattern; or
- multiple dots or patches of the light absorbing material disposed in a linear pattern or other specified pattern.

18. The electronic device as recited in claim 16, further comprising
- a flexible printed circuit coupled to the first light source and to the light guiding component, and
- wherein the light absorbing material is located, at least in part, between a surface of the flexible printed circuit and the surface of the light guiding component.

19. The electronic device as recited in claim 16, wherein the central axis of the light travel of the first light is substantially normal to the edge.

20. The electronic device as recited in claim 16, wherein no light absorbing material is overlying the central area arranged along the central axis of the light travel of the first light.

* * * * *